US011912238B2

(12) United States Patent
Zambare et al.

(10) Patent No.: US 11,912,238 B2
(45) Date of Patent: Feb. 27, 2024

(54) SEAT-INTEGRATED ACCESS SYSTEM FOR STORAGE IN A VEHICLE

(71) Applicant: Rivian IP Holdings, LLC, Plymouth, MI (US)

(72) Inventors: Harshad Zambare, Troy, MI (US); Ryan Cotter, Clawson, MI (US); Steven Mousigian, Lake Forest, CA (US); Daniel John Bateson, Ladera Ranch, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 124 days.

(21) Appl. No.: 17/518,749

(22) Filed: Nov. 4, 2021

(65) Prior Publication Data

US 2023/0034735 A1 Feb. 2, 2023

Related U.S. Application Data

(60) Provisional application No. 63/226,327, filed on Jul. 28, 2021.

(51) Int. Cl.
*B60R 7/04* (2006.01)
*B60R 7/02* (2006.01)
*B60R 11/00* (2006.01)

(52) U.S. Cl.
CPC ............... *B60R 7/043* (2013.01); *B60R 7/02* (2013.01); *B60R 2011/0015* (2013.01)

(58) Field of Classification Search
CPC .. B60R 7/02; B60R 7/043; B60R 7/00; B60R 5/04; B60R 5/006; B60R 2011/0021; B60R 2011/0036; B60R 2011/0015
(Continued)

(56) References Cited

U.S. PATENT DOCUMENTS 5,895,086 A * 4/1999 Carico .................... B60R 11/06
296/37.6
9,863,621 B2 * 1/2018 Dai .......................... B60Q 3/30
(Continued)

FOREIGN PATENT DOCUMENTS

DE 102006025083 A1 12/2007
DE 202018102421 U1 * 7/2018 .............. B60J 5/101
(Continued)

OTHER PUBLICATIONS

Machine translation DE-202018102421 (Year: 2018).*
Machine translation KR-101725418 (Year: 2017).*
Machine translation JP-2005289299 (Year: 2006).*

*Primary Examiner* — Gregory A Blankenship
(74) *Attorney, Agent, or Firm* — HALEY GUILIANO LLP

(57) ABSTRACT

A vehicle includes an occupant compartment, a storage compartment, one or more frame elements, a seat assembly, and a door. The frame element forms at least a part of the storage compartment, which is arranged adjacent to an occupant compartment. The frame element includes an opening between the storage compartment and the occupant compartment. The seat assembly is arranged in the occupant compartment, and optionally includes a console. A threshold element is optionally included to provide an interface to the occupant compartment. The door is configured to block and unblock the opening such that an occupant can access the storage compartment from the occupant compartment. The door is configured to rotate, slide, fold, or otherwise be reconfigured, under manual or automatic operation, to unblock the opening. The door is not part of the seat assembly, and interfaces to the frame element or a threshold element affixed to the frame.

20 Claims, 12 Drawing Sheets

(58) Field of Classification Search
USPC .............................................. 296/37.8, 37.16
See application file for complete search history.

(56) References Cited

U.S. PATENT DOCUMENTS

| | | | |
|---|---|---|---|
| 2002/0021025 A1* | 2/2002 | Lukomskiy | B60P 3/40 |
| | | | 296/190.08 |
| 2016/0083020 A1* | 3/2016 | Chen | B60N 2/22 |
| | | | 296/24.43 |
| 2020/0062185 A1 | 2/2020 | Scaringe et al. | |

FOREIGN PATENT DOCUMENTS

| | | | | |
|---|---|---|---|---|
| EP | 0927662 A1 | | 7/1999 | |
| EP | 0940289 A2 | | 9/1999 | |
| EP | 1870286 A2 | * | 12/2007 | ............ B60R 5/006 |
| JP | 2005289299 A | * | 10/2005 | |
| JP | 4203907 B2 | * | 1/2009 | |
| KR | 101725418 B1 | * | 4/2017 | |
| WO | 2008/151087 A2 | | 12/2008 | |

\* cited by examiner

SEAT-INTEGRATED ACCESS SYSTEM FOR STORAGE IN A VEHICLE

CROSS-REFERENCE TO RELATED APPLICATION

This application claims priority to U.S. Provisional Patent Application No. 63/226,327, filed on Jul. 28, 2021, the contents of which are hereby expressly incorporated by reference in their entirety.

INTRODUCTION

The present disclosure is directed to a vehicle having a frame element, a rear seat assembly, and a movable door. Equipment may be stored in a separate storage compartment, and it would be advantageous to access the equipment from an occupant compartment via the movable door.

SUMMARY

In some embodiments, the present disclosure is directed to a vehicle having a frame element, a seat assembly, and a movable door. In some embodiments, the vehicle includes a threshold element affixed to the frame element. The frame element forms at least a part of a storage compartment arranged adjacent to a separate occupant compartment. The frame element includes an opening between the storage compartment and the occupant compartment, and forms a boundary of the storage compartment. The seat assembly is arranged in the occupant compartment, and includes a center console arranged in a center region. In some embodiments, the seat assembly is affixed to the frame element. The frame element includes an opening to the storage compartment or, if included, the threshold element is affixed to the frame element and includes an opening to the storage compartment and to the center region. The movable door is arranged at the opening of the threshold element. The movable door is configured to achieve a first state where the opening in the threshold element is blocked by the movable door, and a second state where the opening in the threshold element is unblocked by the movable door. To illustrate, in the first state, the door, the threshold element, and the frame element form a boundary of the storage compartment (e.g., a front wall of the storage compartment). In some embodiments, the vehicle includes a truck bed arranged behind the storage compartment, with the truck bed and the storage compartment being separated from each other (e.g., by the frame element or another frame element). To illustrate, in some embodiments, the seat assembly is a rear seat assembly, the storage compartment is arranged behind the rear seat assembly, and the frame assembly forms a front wall of the storage compartment. In some embodiments, in addition to the opening, the storage compartment is accessible from a side of the vehicle via at a side opening. In some embodiments, in addition the opening, the storage compartment is accessible from a first side and a second side of the vehicle via first and second side openings on either side of the vehicle.

In some embodiments, the vehicle includes a rail assembly that is affixed to the frame element or the threshold element, and that is configured to guide displacement of the movable door. In some embodiments, the movable door is a sliding door configured to slide along the rail assembly. In some embodiments, the movable door includes a plurality of slats forming a tambour door. In some embodiments, the vehicle includes a latching mechanism to hold the movable door in the first state and the second state. In some embodiments, the movable door is a pocket door configured to slide into a recess. In some embodiments, the vehicle includes a hinge that couples the movable door to the threshold element. For example, the movable door is configured to rotate about an axis of the hinge to the achieve the first state and the second state.

In some embodiments, the center console is movable between a lowered state and a stowed state, and the first state and the second state are achievable with the center console in the lowered state. In some embodiments, the movable door is configured to achieve the first state and the second state independent of whether the seat assembly (e.g. a seat back thereof) is lowered or upright. In some embodiments, the vehicle includes an actuator and control circuitry. The actuator is coupled to the movable door and configured to move the movable door. The control circuitry is coupled to the actuator and is configured to cause the movable door to achieve the first state and the second state by controlling the actuator.

In some embodiments, the vehicle includes at least one light arranged in the storage compartment, and control circuitry coupled to the at least one light. The control circuitry is configured to provide electrical power to the at least one light to illuminate the storage compartment when the movable door is in the second state (e.g., an opened state). In some embodiments, the vehicle includes an input interface configured to receive input. For example, the control circuitry is further configured to provide electrical power to the at least one light based on the input.

In some embodiments, the present disclosure is directed to an access door assembly for a vehicle storage compartment. The access door assembly includes a frame element, a threshold element, and a movable door. The frame element forms at least a part of a storage compartment arranged behind an occupant compartment. The frame element includes or otherwise forms an opening between the storage compartment and the occupant compartment. The frame element is configured to be coupled to a rear seat assembly arranged in the occupant compartment. If included, the threshold element is affixed to the frame element and includes an opening to the storage compartment and to the center region. The movable door is arranged at the opening of the threshold element. The movable door is configured to achieve a first state where the opening in the threshold element is blocked, and a second state where the opening in the threshold element is unblocked.

In some embodiments, the access door assembly includes a rail assembly that is affixed to the frame element or the threshold element, and that is configured to guide displacement of the movable door. In some embodiments, the movable door is a sliding door configured to slide along the rail assembly. In some embodiments, the movable door includes a plurality of slats forming a tambour door. In some embodiments, the vehicle includes a latching mechanism to hold the movable door in the first state and the second state. In some embodiments, the vehicle includes a hinge that couples the movable door to the threshold element. For example, the movable door is configured to rotate about the hinge to the achieve the first state and the second state. In some embodiments, the access door assembly includes a latching mechanism to hold the movable door in the first state and the second state. In some embodiments, the movable door is configured to achieve the first state and the second state independent of a position of the seat, raised or lowered, and independent of whether the seat is installed. In some embodiments, the frame element is independent of the seat assembly. For example, the frame element and movable door may be installed and functional, whether or not the seat assembly is installed or whichever the seat assembly is raised or lowered.

In some embodiments, the access door assembly includes an actuator and control circuitry. The actuator is coupled to the movable door and configured to move the movable door. The control circuitry is coupled to the actuator and is configured to cause the movable door to achieve the first state and the second state by controlling the actuator.

In some embodiments, the present disclosure is directed to a vehicle having an occupant compartment and a separate storage compartment, with a movable door configured to provide access between the occupant compartment and the storage compartment. In some embodiments, the occupant compartment includes a seat assembly with a center console. In some embodiments, the storage compartment is accessible from each side of the vehicle via a respective side opening, independent of the opening to the occupant compartment. To illustrate, a frame element includes the opening and separates the occupant compartment and the storage compartment. The movable door is arranged to block and unblock the opening of the frame element independent of the seat assembly to disallow or allow access between the occupant compartment and the storage compartment.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

The present disclosure is directed to systems and method for providing an occupant access to a storage area behind seats from the interior cabin of the vehicle. In some embodiments, a passthrough is integrated into the body structure, as opposed to the seats, that separates the seat from the storage area to provide the access. In some embodiments, the passthrough includes a tambour door mechanism rather than a hinged folding door. To illustrate, while the storage compartment may be accessed from outside of the vehicle, the storage compartment may also be accessed from within the vehicle cabin (e.g., the occupant compartment) while occupants are seated on the rear seats. In an illustrative example, a user could access their ski boots stored in the storage compartment while seated inside the vehicle. Further, in some circumstances, there may be impediments to accessing the storage compartment from outside the vehicle (e.g., other vehicles parked near the vehicle, or a wall or other barrier nearby), and the access door allows the user to still reach objects within the storage compartment.

Figure 1:
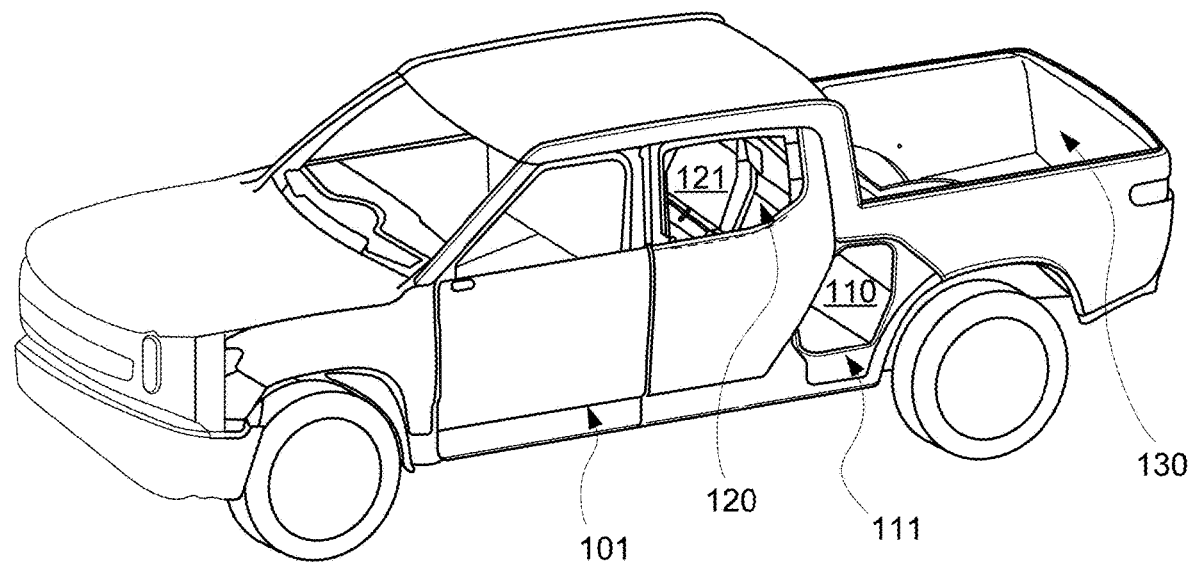
FIG. 1 shows a perspective view of a vehicle having an illustrative storage compartment, in accordance with some embodiments of the present disclosure.

FIG. 1 shows a perspective view of vehicle 100 having illustrative storage compartment 110, in accordance with some embodiments of the present disclosure. Some components of vehicle 100 are not illustrated in FIG. 1 such as, for example, the seats or interior components. As illustrated, vehicle 100 includes structure 101, occupant compartment 120, storage compartment 110, and cargo bed 130. Vehicle 100 may include a truck having a truck bed, a sport utility vehicle, a sedan, a coupe, or any other suitable vehicle having any suitable number of compartments and doors. As illustrated, vehicle 100 is a truck having cargo bed 130 (e.g., a truck bed), and storage compartment 110 arranged between occupant compartment 120 and cargo bed 130. Storage compartment 110 is separate from occupant compartment 120 and cargo bed 130, as illustrated. In some embodiments, as illustrated, storage compartment 110 is accessible via one or two openings arranged on one or both sides of vehicle 100 (e.g., of which side opening 111 is visible in FIG. 1). For example, the one or more side openings (e.g., side opening 111) are independent of opening 121 (e.g., having an access door) between occupant compartment 120 and storage compartment 110.

Figure 2:
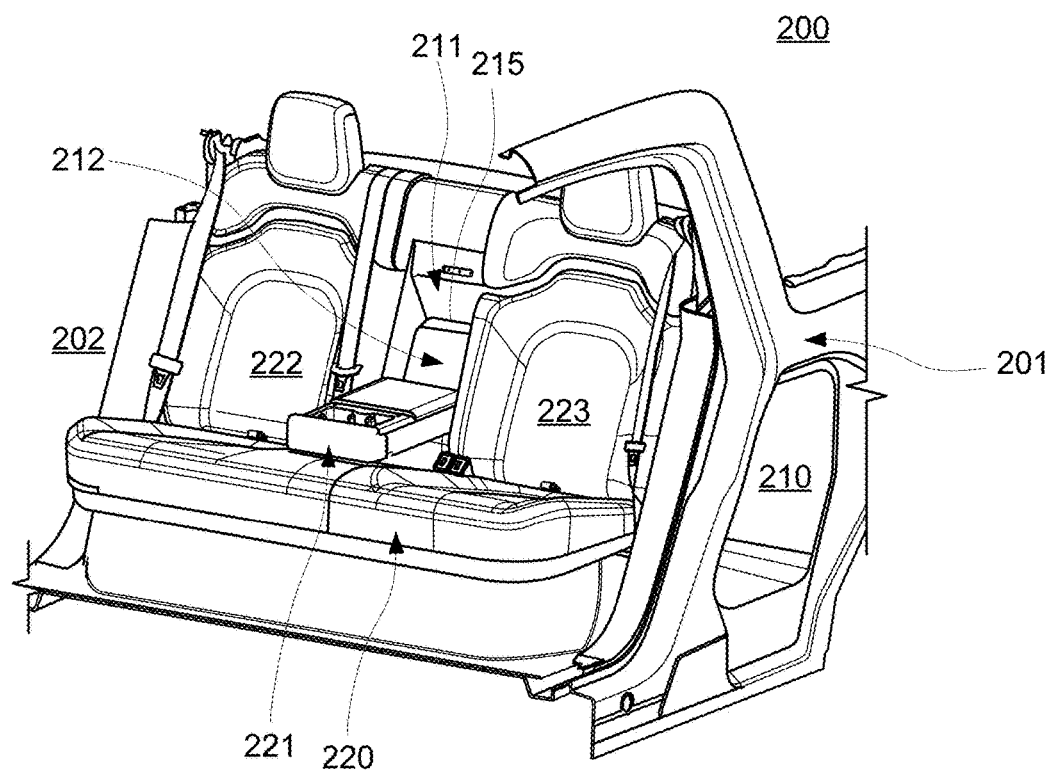
FIG. 2 shows a perspective view of a portion of an illustrative vehicle frame having an illustrative storage compartment and passthrough at the rear center console, in accordance with some embodiments of the present disclosure.

FIG. 2 shows a perspective view of a portion of illustrative vehicle frame 201 (e.g., occupant compartment 202 thereof) having illustrative storage compartment 210 and passthrough 212 at rear center console 221, in accordance with some embodiments of the present disclosure. To illustrate, assembly 200 includes seat assembly 220 (e.g., a rear seat assembly) and frame 201, which forms storage compartment 210, and is affixed with door assembly 211 having passthrough 212. Gear, equipment, coolers, refrigerators, clothing, bags, toys, backpacks, shoes, or other items may be stored in storage compartment 210, with passthrough 212 allowing access to stored items without folding rear seats 222 and 223 down, for example. Storage compartment 210 is arranged behind seat assembly 220, with passthrough 212 connecting occupant compartment 202 and storage compartment 210. As illustrated, seat assembly 220 (e.g., a rear seat assembly) is affixed to vehicle frame 201 (e.g., a frame element thereof).

In an illustrative example, vehicle frame 201 (e.g., or one or more frame elements thereof) form at least a part of storage compartment 210 arranged behind occupant compartment 202. Vehicle frame 201, or a frame element thereof, includes an opening (e.g., passthrough 212) between storage compartment 210 and occupant compartment 202. Seat assembly 220, which is illustrated as a rear seat assembly, is arranged in occupant compartment 202 and includes center console 221 arranged in a center region of seat assembly 220 (e.g., centered in the left-right direction between seats 222 and 223). Door assembly 211 includes a threshold element affixed to vehicle frame 201 or a frame element thereof. Door assembly 211 includes an opening to storage compartment 210 and to the center region of seat assembly 220. A movable door (e.g., door 215) is arranged at the opening of door assembly 211 or a threshold element thereof. Door 215 is configured to achieve a first state where passthrough 212 is blocked (e.g., door 215 is in a closed state), and a second state where passthrough 212 is unblocked (e.g., door 215 is in an opened state).

Figure 3:
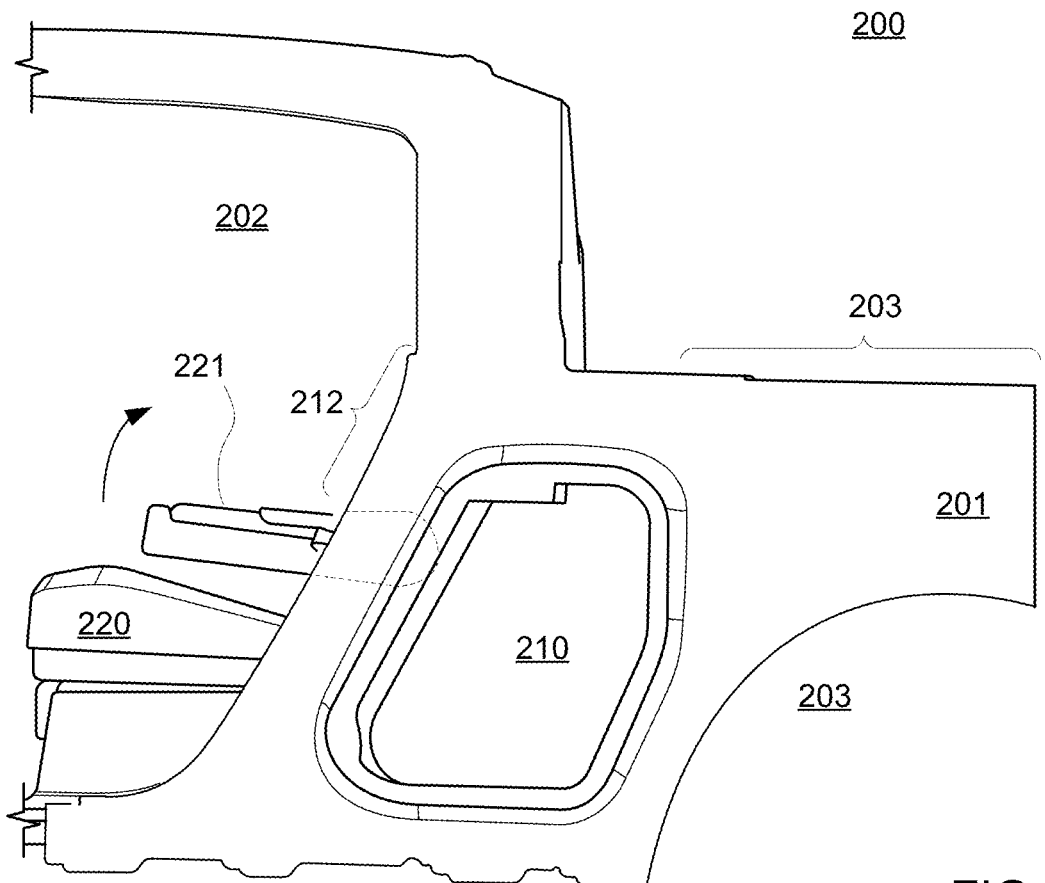
FIG. 3 shows a side view of a portion of the illustrative vehicle frame of FIG. 2, in accordance with some embodiments of the present disclosure.

FIG. 3 shows a side view of a portion of illustrative vehicle frame 201 of FIG. 2, in accordance with some embodiments of the present disclosure. To illustrate, vehicle frame 201 forms occupant compartment 202, storage compartment 210, and cargo bed 203. It will be understood that, although illustrated as a truck (e.g., cargo bed 203 is a truck bed), the present disclosure applies to vehicles without a cargo bed (e.g., a sedan, coupe, sport-utility vehicle, crossover, or other vehicles having seats with storage arranged behind the seats). As illustrated in FIG. 3, center console 221 is in a lowered state such that passthrough 212 is not blocked by center console 221. The curved arrow in FIG. 3 illustrates the direction along which center console 221 may be raised. In some embodiments, center console 221 is movable between the lowered state and a stowed state, wherein the first state (e.g., closed) and the second state (e.g., opened) of door 215 are achievable with center console 221 in the lowered state. In some embodiments, the movable door (e.g., door 215) is configured to achieve the first state (e.g., closed) and the second state (e.g., opened) independent of whether a seat of seat assembly 220 (e.g., a rear seat) is lowered or upright. For example, because door 215 is interfaced to vehicle frame 201, door 215 may be operated independent of the seat position as opposed to a configuration where a door may be part of a seat assembly rather than affixed to the frame.

Figure 4:
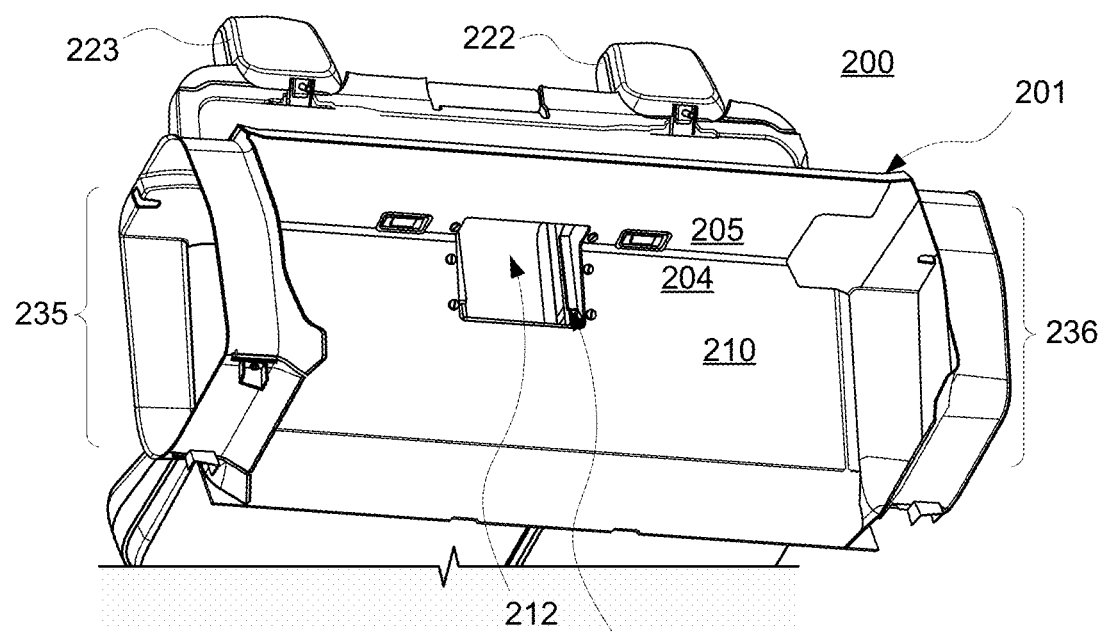
FIG. 4 shows a perspective view, from below, of a portion of the illustrative vehicle frame of FIG. 2, in accordance with some embodiments of the present disclosure.

FIG. 4 shows a perspective view, from below, of a portion of illustrative vehicle frame 201 of FIG. 2, in accordance with some embodiments of the present disclosure. To illustrate, vehicle frame 201 forms storage compartment 210, which includes side openings 235 and 236 on either side of the vehicle. As illustrated, passthrough 212 connects storage compartment 210 with occupant compartment 202 (e.g., obstructed in FIG. 4). As illustrated in FIG. 4, because door 215 is open (not visible in FIG. 4) and center console 221 is lowered (not visible in FIG. 4), passthrough 212 is unblocked (e.g., accessible by an occupant in occupant compartment 202, sitting on seat 222 or 223). Storage compartment 210, as illustrated, is partially defined by top surface 205 and front surface 204, which may be formed by one or more frame elements (e.g., bent, pressed, or otherwise formed sheet metal). Side openings 235 and 236 are defined by sheet metal features of vehicle frame 201, forming loops to shape each opening contour. In an illustrative example, a threshold element may be affixed to one or more frame elements of vehicle frame 201 (e.g., the one or more frame elements forming top surface 205 and/or front surface 204). In an illustrative example, in a first state (e.g., a closed state), door 215, vehicle frame 201 or a frame element thereof, and possible a threshold element, form a boundary of storage compartment 210 (e.g., a front wall of storage compartment 210), independent of seat assembly (e.g., whether seat assembly 220 is installed, or a position of a seat of seat assembly 220). Storage compartment 210 is separate from occupant compartment 220 and cargo bed 203, as illustrated. In some embodiments, as illustrated, storage compartment 210 is accessible via one or two openings arranged on one or both sides of vehicle 200 (e.g., side openings 235 and 236). For example, side opening 235 and 236 are independent of passthrough 212 (e.g., an opening having door 215) between occupant compartment 202 and storage compartment 210.

Figure 5:
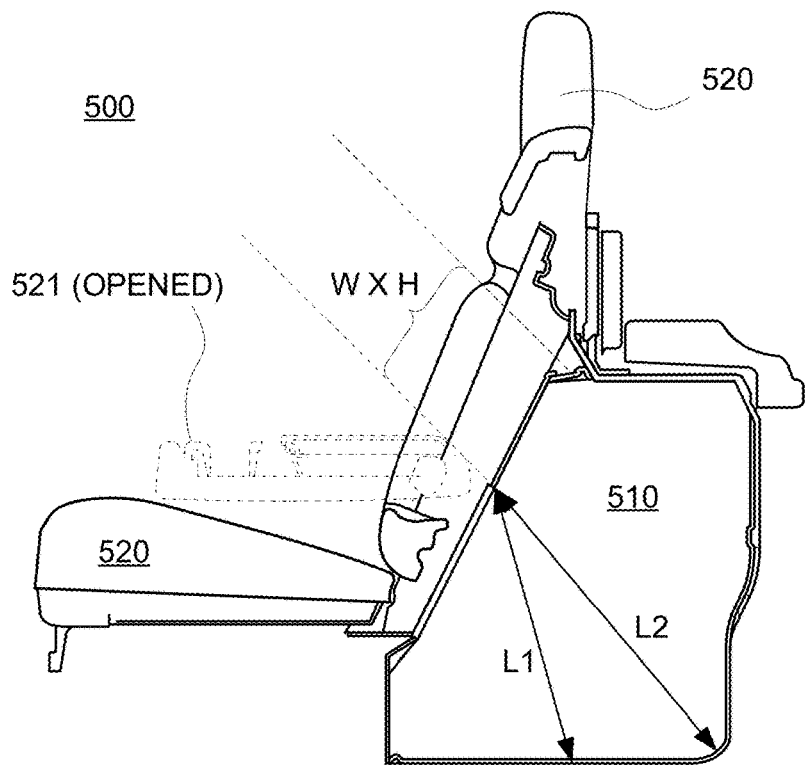
FIG. 5 shows a side view of a portion of a vehicle having an illustrative access door to a storage compartment, in accordance with some embodiments of the present disclosure.

FIG. 5 shows a side view of a portion of vehicle 500 having an illustrative access door to storage compartment 510, in accordance with some embodiments of the present disclosure. As illustrated in FIG. 5, vehicle 500 includes center console 521 (e.g., in an opened or lowered configuration), seat assembly 520, and storage compartment 510 arranged behind seat assembly 520. To illustrate, vehicle 500 may be the same as vehicle 100 of FIG. 1, or include assembly 200 of FIGS. 2-4.

Figure 8:
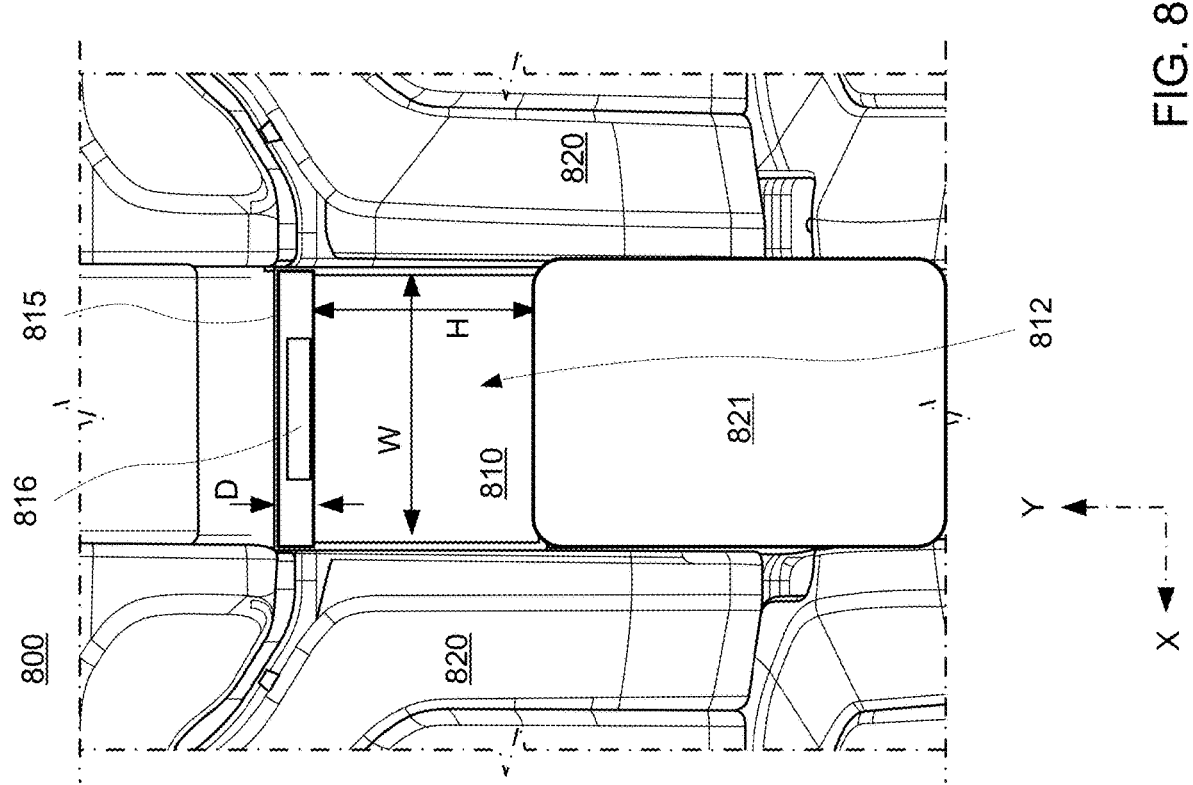
FIG. 8 shows an elevated front view of an illustrative occupant compartment, having a vertical-sliding access door for providing access to a storage compartment, in accordance with some embodiments of the present disclosure.
Figure 7:
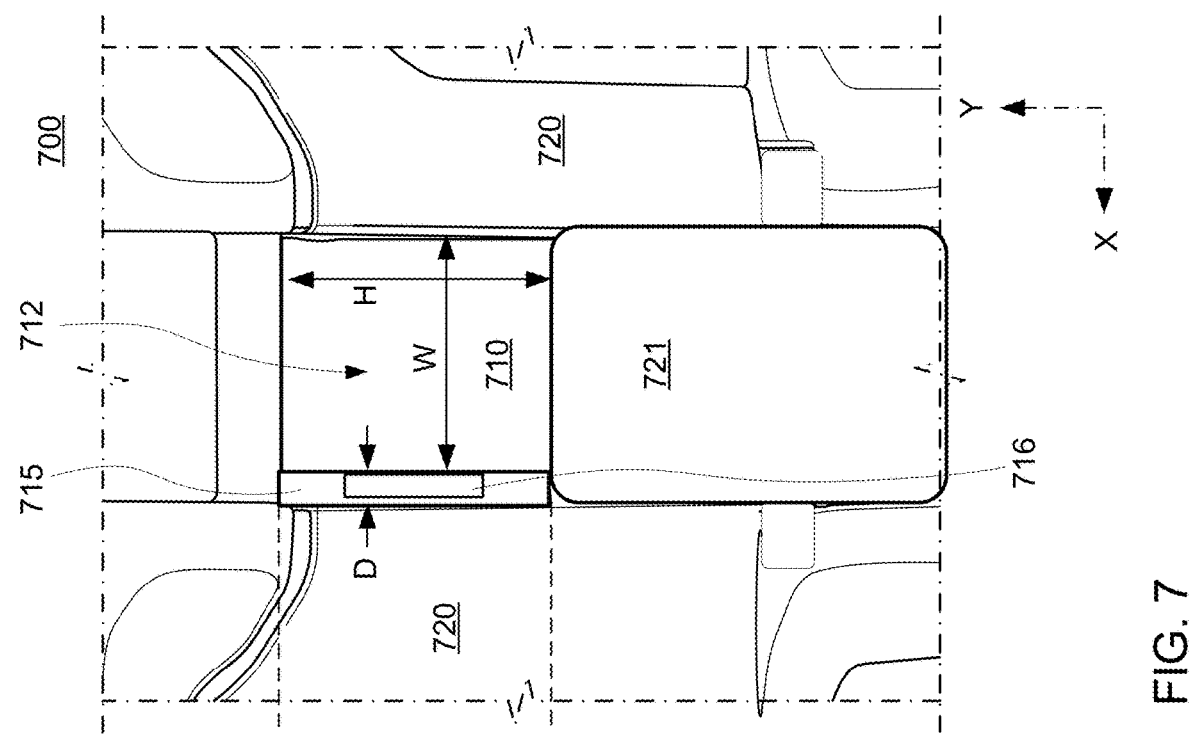
FIG. 7 shows an elevated front view of an illustrative occupant compartment, having a side-sliding access door for providing access to a storage compartment, in accordance with some embodiments of the present disclosure.

As illustrated in FIG. 5 as well as the examples shown in FIG. 7 and FIG. 8, the width and height of the passthrough, indicated by "W" and "H" respectively, may be any suitable dimension. For example, the width/height may be about 200 mm/200 mm, or any other suitable dimension (e.g., 232 mm/197 mm). In a further example, the width may be any suitable value within 150 mm-300 mm, and the height may be any suitable value within 150 mm-300 mm.

As illustrated, the size and position of the passthrough may allow for an occupant to access all or almost all of storage compartment 510 from within the occupant compartment 202 (FIG. 2). For example, the dimensions indicated by "L1" and "L2" correspond to extent of reach that may be useful for the occupant while seated in a seat of seat assembly 520, and may be any suitable dimension that allows access to storage compartment. To illustrate, either of L1 and L2 may be 400 mm or greater, 300 mm or greater, or any other suitable dimension (e.g., L1 may be 400 mm and L2 may be 470 mm).

Figure 6:
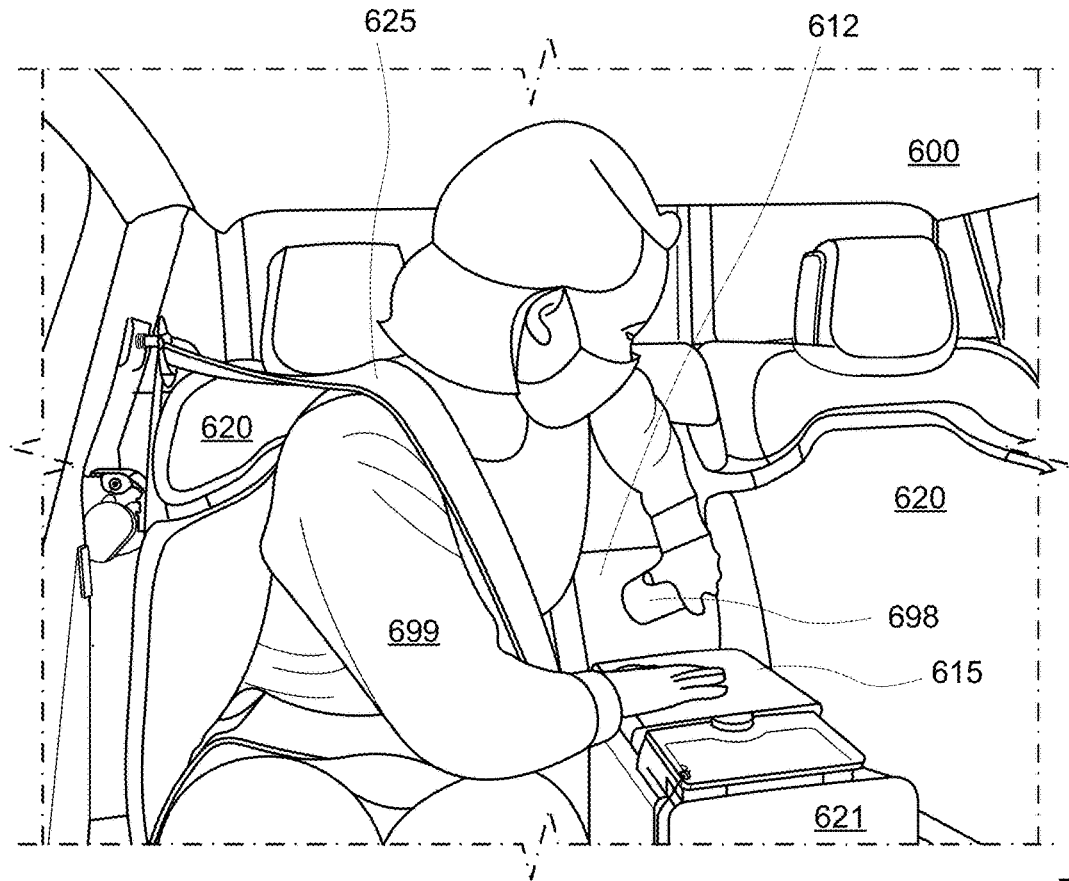
FIG. 6 shows a front view of an illustrative occupant compartment with an occupant accessing a storage compartment, in accordance with some embodiments of the present disclosure.

FIG. 6 shows a front view of illustrative occupant compartment 600 with occupant 699 accessing a storage compartment, in accordance with some embodiments of the present disclosure. As illustrated, occupant 699 can access the storage compartment via passthrough 612, when center console 621 is lowered. In some embodiments, a center console need not be included (not illustrated). In some embodiments, a center console may be included but need not be movable (e.g., a center console may be stationary in the position illustrated in FIG. 6, without the capability to fold up). Referencing FIG. 5, occupant 699 may be able to reach portions of the storage compartment corresponding to dimensions L1 or L2, or further extents towards, or at, the laterally outer corners of the storage compartment nearer to the side openings. As illustrated in FIG. 6, occupant 699 need not unbuckle seatbelt 625, get up from seat 620, or fold seat 620 down to access passthrough 612 (e.g., to retrieve or store item 698). As illustrated, door 615 is opened (e.g., rotated down to lie on center console 621).

Figure 9:
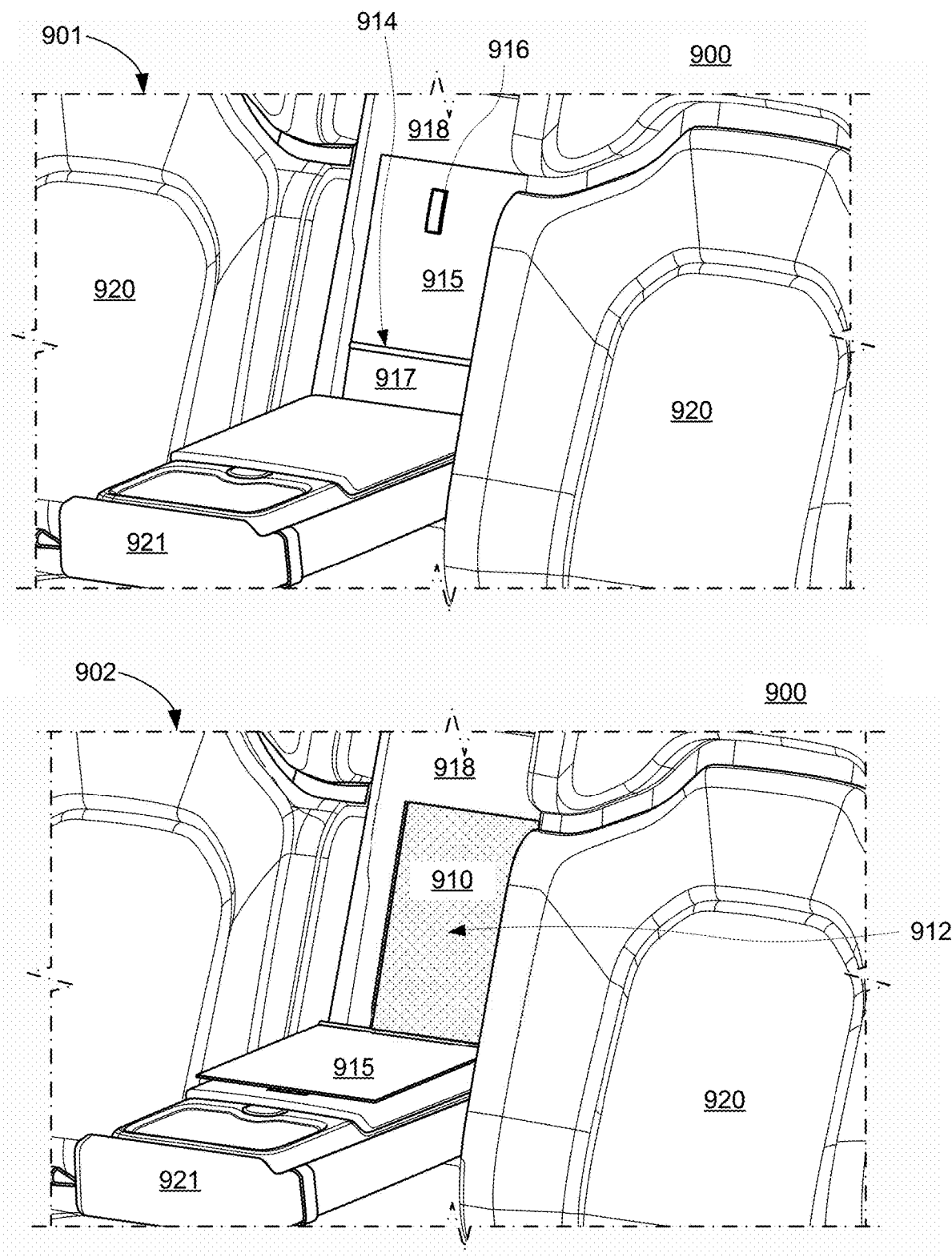
FIG. 9 shows a perspective view of an illustrative occupant compartment, having a hinged access door for providing access to a storage compartment, in two configurations, in accordance with some embodiments of the present disclosure.

FIGS. 7-9 show illustrative doors having various opening trajectories, in accordance with some embodiments of the present disclosure.

FIG. 7 shows an elevated front view of illustrative occupant compartment 700, having a side-sliding access door (i.e., door 715 e.g., in an opened position) for providing access to storage compartment 710 via opening 712 (e.g., a passthrough), in accordance with some embodiments of the present disclosure. As illustrated, seat 720 and center console 721 (e.g., in a lowered position) are arranged in occupant compartment 700. To illustrate, occupant compartment 700 may be included in any suitable vehicle or access door assembly (e.g., as illustrated in FIGS. 1-6).

As illustrated, the width and height of the passthrough, indicated by "W" and "H" respectively, may be any suitable dimension. To illustrate, the side-to-side actuating door may help maximize or otherwise increase the vertical length "H" of opening 712. In some configurations, a side-to-side actuating door may limit the horizontal dimension "W" of opening 712 to accommodate the handle 716 of door 715. Door 715, as illustrated, is configured to translate (e.g., slide) along axis "X" due to either manual actuation or a controlled actuator, for example as illustrated by the dashed outline. The ratio of H/W may be one, less than one, or greater than one, and the ratio of D/W may be 1/20, 1/10, 3/20, between 0 and 0.1, between 0 and 0.2, any other suitable ratio or range of ratios, or any combination thereof. In an illustrative example, the dimension "H" may be less than 200 mm, greater than 200 mm, between 150-250 mm, or any other suitable dimension (e.g., 197 mm). In a further illustrative example, the dimension "W" may be less than 200 mm, greater than 200 mm, between 150-250 mm, or any other suitable dimension (e.g., 200 mm). In a further example, the dimension "D" that corresponds to the width of opening 712 blocked by the portion of door 715 including handle 716 may be between 10-50 mm, between 0-10% of the width W (e.g., the dimension D may be zero if the door opens flush with the opening), between 5-25% of the width W, or any other suitable value (e.g., 30 mm). In some embodiments, the ratio of H/W is between 0.9-1.5. In some embodiments, the ratio of H/W is between 0.5-2.

FIG. 8 shows an elevated front view of illustrative occupant compartment 800, having a vertical-sliding access door (i.e., door 815) for providing access to storage compartment 710 via opening 812, in accordance with some embodiments of the present disclosure. As illustrated, seat 820 and center console 821 (e.g., in a lowered position) are arranged in occupant compartment 800.

As illustrated, the width and height of the passthrough, indicated by "W" and "H" respectively, may be any suitable dimension. To illustrate, the up-down actuating door may help maximize or otherwise increase the horizontal length "W" of opening 812. In some configurations, an up-down actuating door may limit the vertical dimension "H" of opening 812 to accommodate the handle 816 of door 815 (e.g., "H" may be greater than 200 mm, less than W, or less than 200 mm such as 185 mm). Door 815, as illustrated, is configured to translate (e.g., slide) along axis "Y" due to either manual actuation or a controlled actuator, for example. The ratio of H/W may be one, less than one, or greater than one and the ratio of D/W may be 0.1, less than 0.1, or greater than 0.1. In an illustrative example, the dimension "W" may be greater than 200 mm, greater than 230 mm, between 200-250 mm, or any other suitable dimension (e.g., 232 mm). In a further example, the dimension "D" that corresponds to the width of opening 812 blocked by the portion of door 815 including handle 816 may be between 10-50 mm, or any other suitable value (e.g., 30 mm). In some embodiments, the ratio of H/W is between 0.5-1.5. In some embodiments, the ratio of H/W is between 0.75-1.3.

FIG. 9 shows a perspective view of illustrative occupant compartment 900, having a hinged access door (i.e., door 915) for providing access to a storage compartment 910 via opening 912, in two configurations, in accordance with some embodiments of the present disclosure. As illustrated, seat 920 and center console 921 are arranged in occupant compartment 900. Panel 901 illustrates a configuration wherein door 915 is closed, while panel 902 illustrates a configuration wherein door 915 is open and storage compartment 910 is accessible from occupant compartment 900. To illustrate, occupant compartment 900 may be included in any suitable vehicle or access door assembly (e.g., as illustrated in FIGS. 1-6).

Door 915, as illustrated, is configured to rotate about hinge 914 due to a force applied to handle 916 by either manual actuation or a controlled actuator, for example. Hinge 914 couples door 915 to stationary element 917 (e.g., a panel as illustrated). For example, stationary element 917 may have a corresponding height (e.g., relative to a surface or thickness of center console 921 or a height relative to seat bottom of seat 920) that is at least the thickness of center console 921 such that hinge 914 is arranged at the top of center console 921 (e.g., such that door 915 can rotate onto center console 921 and lie horizontal or nearly horizontal). Element 918, which may include a chute or other structural element, is configured to bound opening 912 and provide an interface for door 915 to close against. To illustrate, element 918 may be stylized to match the interior of occupant compartment 900. In some embodiments, one or more latches or detents may be included on door 915, element 918, or both, to hold door 915 in a particular state. For example, door 915, element 918, or both, may include magnets, catches, keylocks, pins, cinching mechanisms, any other suitable latching mechanism, or any combination thereof to form a position detent and hold door 915 in a position (e.g., open, closed, or either). In some embodiments, a door assembly may include more than hinge to provide a compound opening trajectory (e.g., to follow a curved surface of center console 921). In some embodiments, center console 921 is movable between the lowered state and a stowed state, wherein the first state (e.g., closed)

and the second state (e.g., opened) of door 915 are achievable with center console 921 in the lowered state. In some embodiments, the movable door (e.g., door 915) is configured to achieve the first state (e.g., closed) and the second state (e.g., opened) independent of whether seat 920 (e.g., a rear seat) is lowered or upright. In an illustrative example, in a first state (e.g., the closed state), door 915, a threshold element (e.g., element 918), and a frame element form a boundary of storage compartment 910 (e.g., a front wall of storage compartment 910).

FIGS. 10-14 show several illustrative access door assemblies having up-down sliding opening trajectories, in accordance with some embodiments of the present disclosure.

Figure 10:
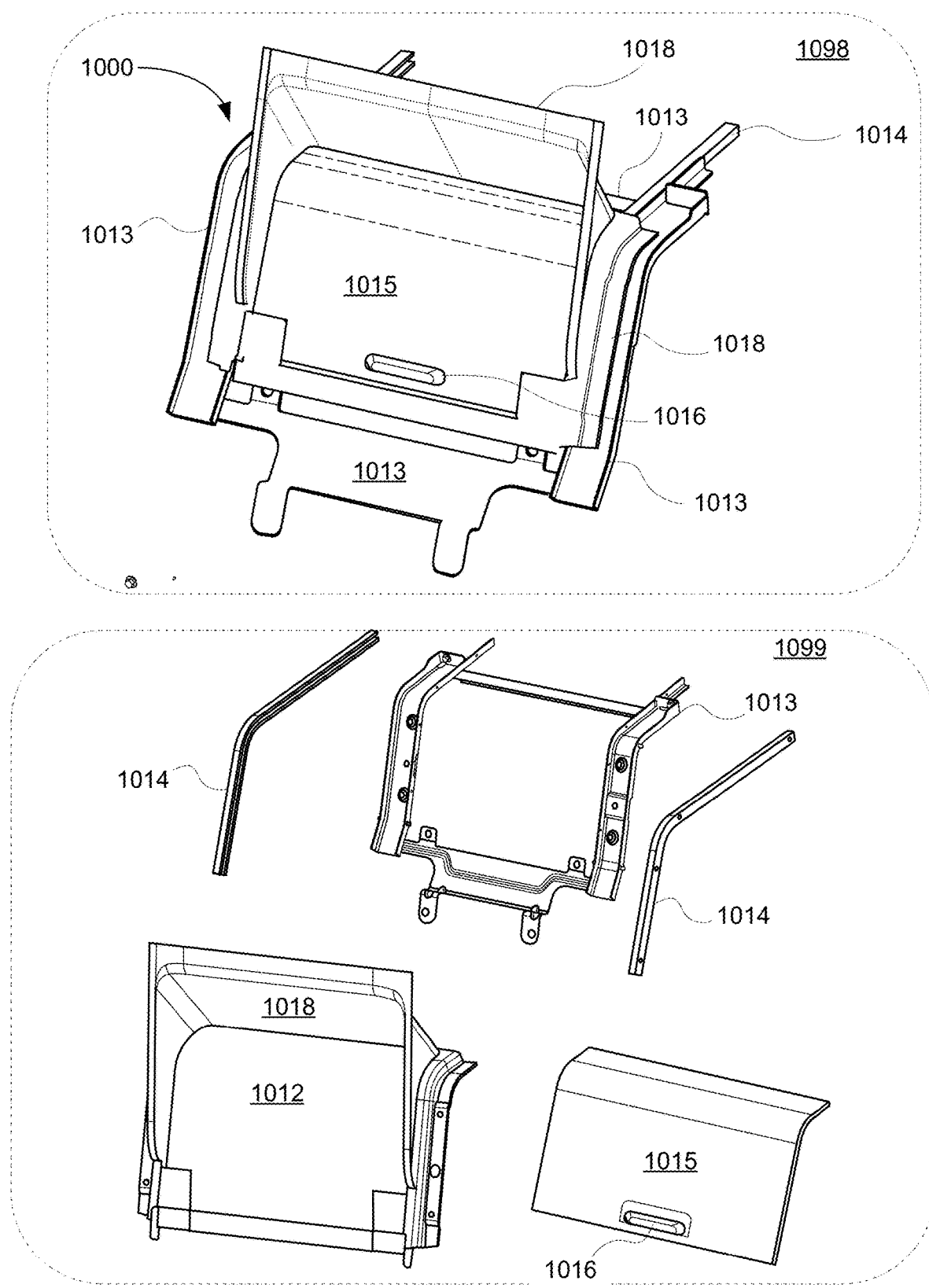
FIG. 10 shows a perspective (i) assembled and (ii) exploded view of an illustrative access door assembly, in accordance with some embodiments of the present disclosure.

FIG. 10 shows a perspective (i) assembled view (panel 1098) and (ii) exploded view (panel 1099) of an illustrative access door assembly (i.e., assembly 1000), in accordance with some embodiments of the present disclosure. As illustrated, assembly 1000 includes door 1015 with handle 1016, chute 1018 (e.g., a threshold element), element 1013, and guides 1014 (e.g., a C-channel, as illustrated). Door 1015, as illustrated, is a tambour-style door, including a plurality of slats extending horizontally and arranged on top of each other vertically. Accordingly, door 1015 is configured to move along guides 1014 to open or close opening 1012 of chute 1018.

In an illustrative example, element 1013 may be affixed to, or integrated as part of, a vehicle frame or vehicle body structure. In some embodiments, the front wall of a storage compartment corresponds to a frame element to which element 1013 is affixed to (e.g., welded, bolted, riveted, adhered) or included as a part of In some embodiments, element 1013 need not be a separate component, and chute 1018 may affix to the front wall of the storage compartment. In some embodiments, both element 1013 and chute 1018 need not be a separate components, and a frame element may be configured to accommodate door 1015 directly (e.g., the front wall of the storage compartment may be configured and contoured to define opening 1012). In an illustrative example, in a first state (e.g., a closed state), door 1015, a threshold element (e.g., element 1013 and possibly chute 1018), and a frame element form a boundary of the storage compartment (e.g., a front wall of the storage compartment).

In a further illustrative example, guides 1014 may be made of nylon or any other suitable material such as plastic, metal, wood, or ceramic. In some embodiments, for example, guides 1014 are made of nylon and have a "C" cross-sectional shape to allow door 1015 to slide along the interior surface of the "C" during opening and closing. In some embodiments, an access door assembly may include a rail system rather than guides. For example, a rail system may include rollers (e.g., ball rollers, cylinder rollers, tapered rollers) and journals to constrain the rollers.

Figure 11:
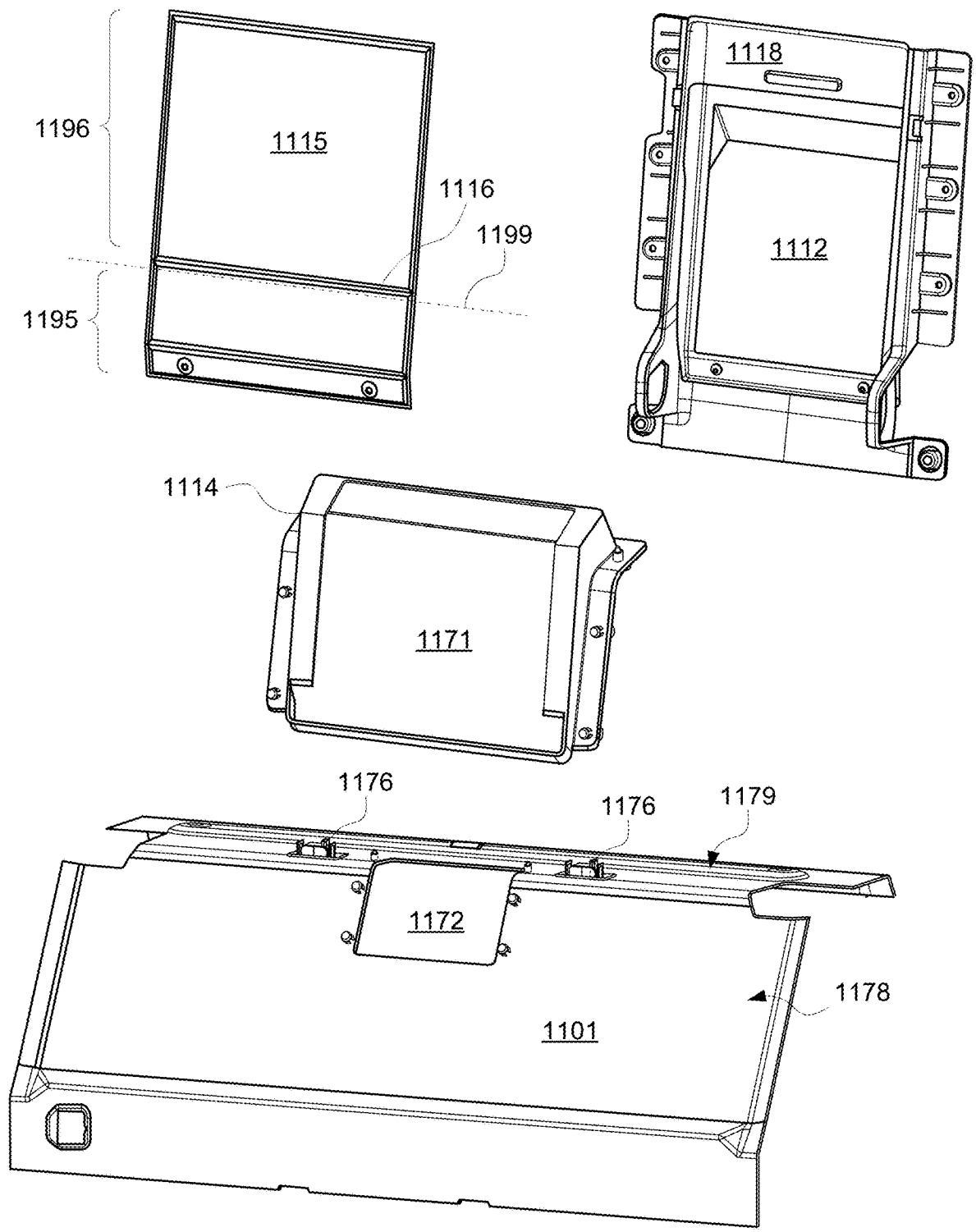
FIG. 11 shows a perspective (i) assembled and (ii) exploded view of an illustrative assembly, in accordance with some embodiments of the present disclosure.

FIG. 11 shows a perspective (i) assembled view (from the rear and above) and (ii) exploded view of an illustrative assembly, in accordance with some embodiments of the present disclosure. As illustrated, assembly 1100 includes door 1115, threshold element 1118 with opening 1112, threshold element 1114 with opening 1171, and frame element 1101 with opening 1172. Door 1115, as illustrated, is a sectioned door. Assembly 1100 is designed to position components away from opening 1112 behind threshold element 1118, above openings 1112, 1171, and 1172. In some embodiments, openings 1112, 1171, and 1172 coincide with each other to provide access from an occupant compartment to a storage compartment. In an illustrative example, frame element 1101 may be installed to partially define a storage compartment, and threshold elements 1114 and 1118 may be mounted to frame element 1101 to form a passthrough. Threshold element 1118 may be styled similar to, or otherwise compatible with, the interior of the occupant compartment. For example, an occupant will observe threshold element 1118 and door 1115 from the occupant compartment, while threshold element 1114 and frame element 1101 may be completely, or otherwise mostly, obscured (e.g., by a seat assembly). In some embodiments, a center console or armrest is configured to interface to threshold element 1118. As illustrated, door 1115 includes a stationary portion 1195 and a movable portion 1196 joined by a hinge, wherein movable portion 1196 is configured to rotate open about axis 1199 (e.g., similar to door 915 of FIG. 9). As illustrated, frame element 1101 includes lights 1176 installed on top surface 1179 (e.g., forming at least part of a top face of the storage compartment). Components such as, for example, lights (e.g., lights 1176), electronics, wiring harnesses, or other suitable components may be arranged on or above top surface 1179, out of the way of opening 1172. In an illustrative example, lights 1176 may be configured to turn on when door 1115 is opened, and turn off when door 1115 is closed, based on a suitable sensor signal (e.g., as described in the context of FIG. 16). Frame element 1101 also includes surface 1178 (e.g., forming at least part of a front face of the storage compartment), against which seats, consoles, or both may be mounted in the occupant compartment. In an illustrative example, in a first state (e.g., a closed state), door 1115, a threshold element (e.g., element 1114, element 1118, or both), and frame element 1101 form a boundary of the storage compartment (e.g., a front wall of the storage compartment), regardless of the position of a seat of the vehicle.

Figure 12:
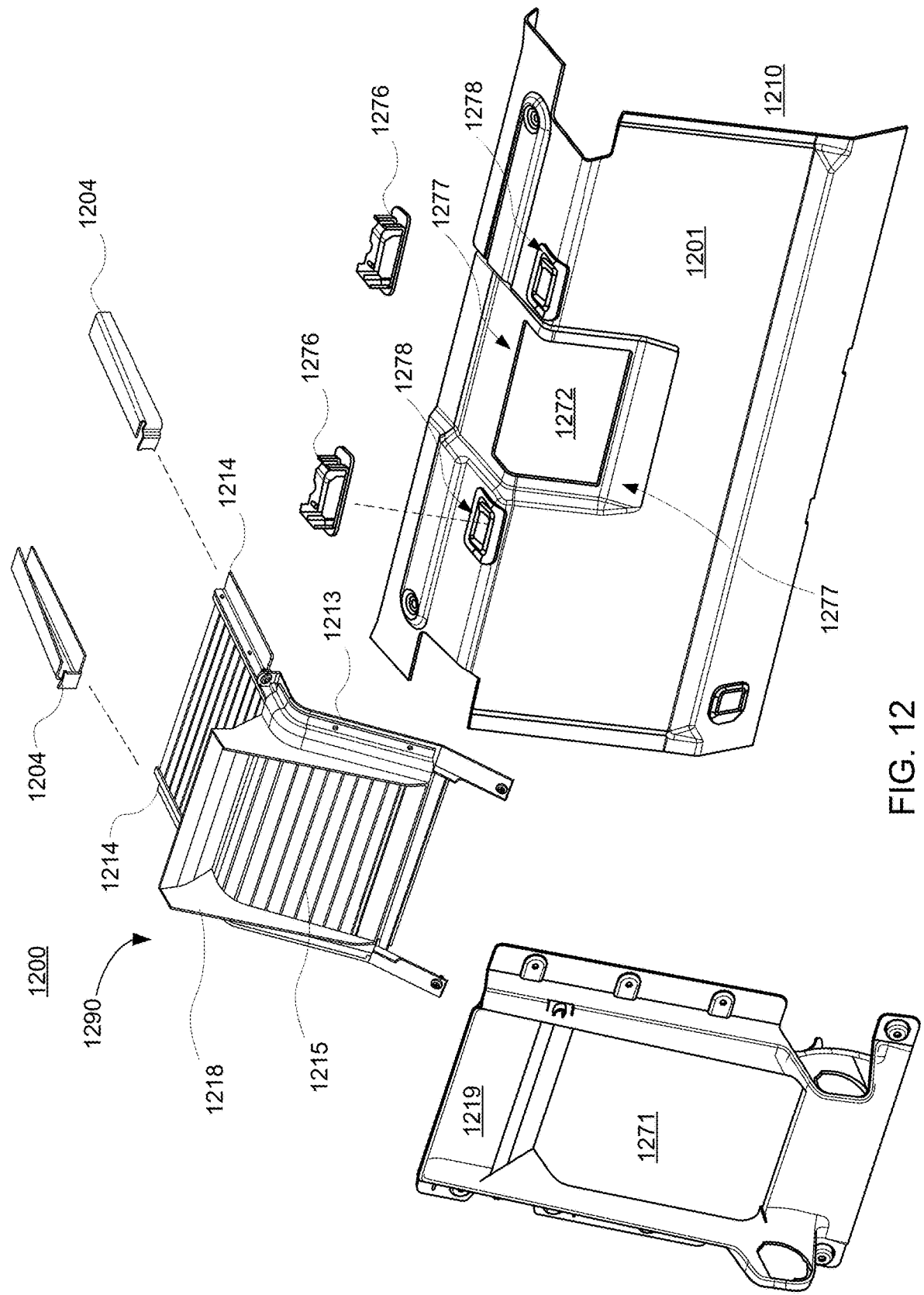
FIG. 12 shows a perspective view of illustrative vehicle components for forming an access door assembly, in accordance with some embodiments of the present disclosure.

FIG. 12 shows a perspective view of illustrative vehicle components for forming access door assembly 1200, in accordance with some embodiments of the present disclosure. To illustrate, access door assembly 1200 may be similar to assembly 1100 of FIG. 11, except that door 1215 is configured to slide along a track formed by rails 1214, rather than articulate about a hinge. As illustrated, an assembly may include frame element 1201 having opening 1272, door assembly 1290, threshold element 1219 having opening 1271, brackets 1204, and lights 1276. Door assembly 1290 includes door 1215, threshold element 1218, threshold element 1213, and rails 1214. Brackets 1204 are configured to mount rails 1214 to frame element 1201 to secure door assembly 1290. Lights 1276 are configured to be mounted to frame element 1201, at sockets 1278 (e.g., which may include mechanical interfaces and electrical connectors for powering lights 1276), to provide light to storage compartment 1210. In an illustrative example, lights 1276 may be configured to turn on when door 1215 is opened, and turn off when door 1215 is closed, based on a suitable sensor signal from control circuitry (e.g., as described in the context of FIG. 16). In a further illustrative example, lights 1276 may be configured to turn on when motion is sensed in storage compartment 1210 or threshold 1272, and turn off after a predetermined time without motion, based on a suitable sensor signal (e.g., as described in the context of FIG. 16). In a further illustrative example, lights 1276 may be configured to turn on and off based on a user-controlled interface (e.g., a switch or button, as described in the context of FIG. 16). In some embodiments, door 1215 (e.g., and a corresponding opening in threshold elements 1218 and 1213), opening 1271, and opening 1272 coincide with each other to provide access from an occupant compartment to storage compartment 1210. In some embodiments, threshold element 1219 is configured to provide an interface to the occupant compartment and accordingly may be styled to be compatible with the vehicle interior. To illustrate, a center console (e.g., an independent component, or part of a seat assembly) may seat against threshold element 1219, covering and uncovering opening 1271 when raised or lowered.

As illustrated, frame element 1201 includes recess 1277, which is configured to accommodate door assembly 1290 (e.g., threshold element 1213 thereof). In some embodiments, a recess such as recess 1277 is included to allow threshold element 1213 to be flush with the rest of the surface of frame element 1201 (e.g., to allow a seat or other components to be affixed to frame element 1201). In some embodiments, a recess such as recess 1277 need not be included or otherwise door assembly 1290 may be affixed to a non-recessed portion of frame element 1201. In an illustrative example, in a first state (e.g., a closed state), door 1215, a threshold element (e.g., threshold element 1213, threshold element 1218, and possibly threshold element 1219), and frame element 1201 form a boundary of storage compartment 1210 (e.g., a front wall of storage compartment 1210), regardless of the position of a seat of the vehicle or if the seat is installed.

Figure 13:
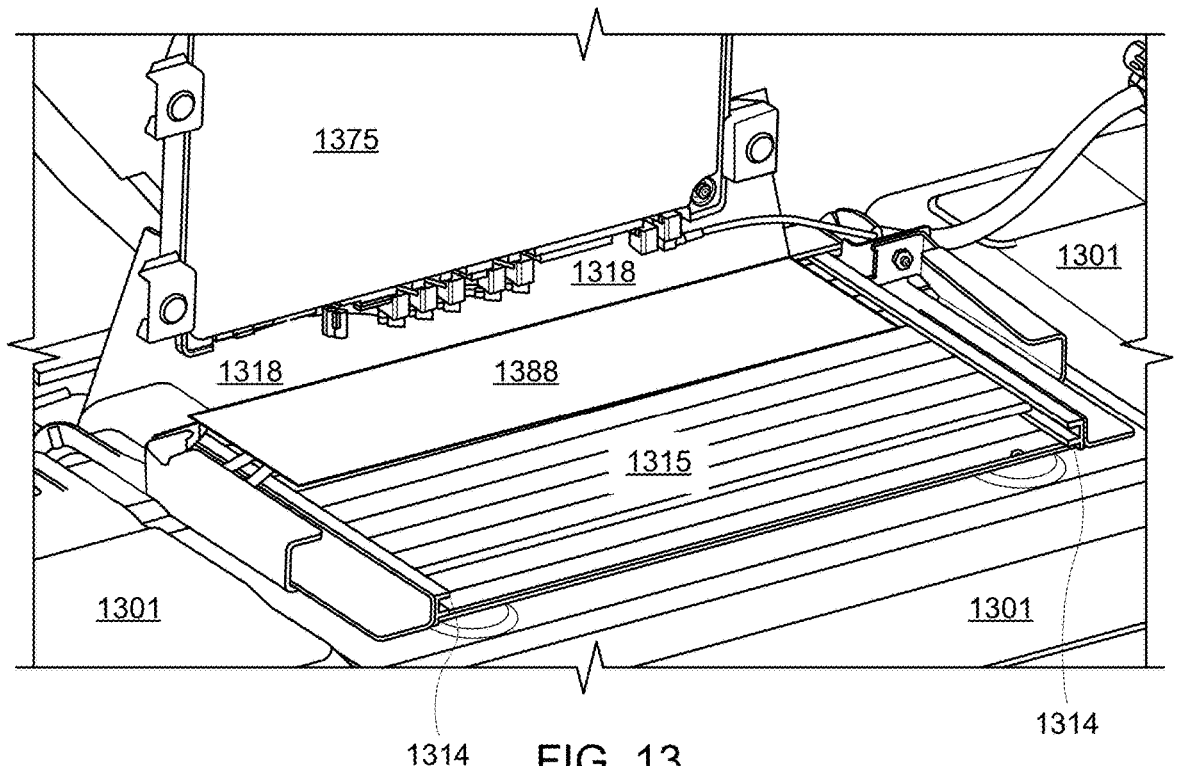
FIG. 13 shows a perspective view, from the rear of and above an occupant compartment, of an illustrative access door assembly with a rear flange, in accordance with some embodiments of the present disclosure.
Figure 14:
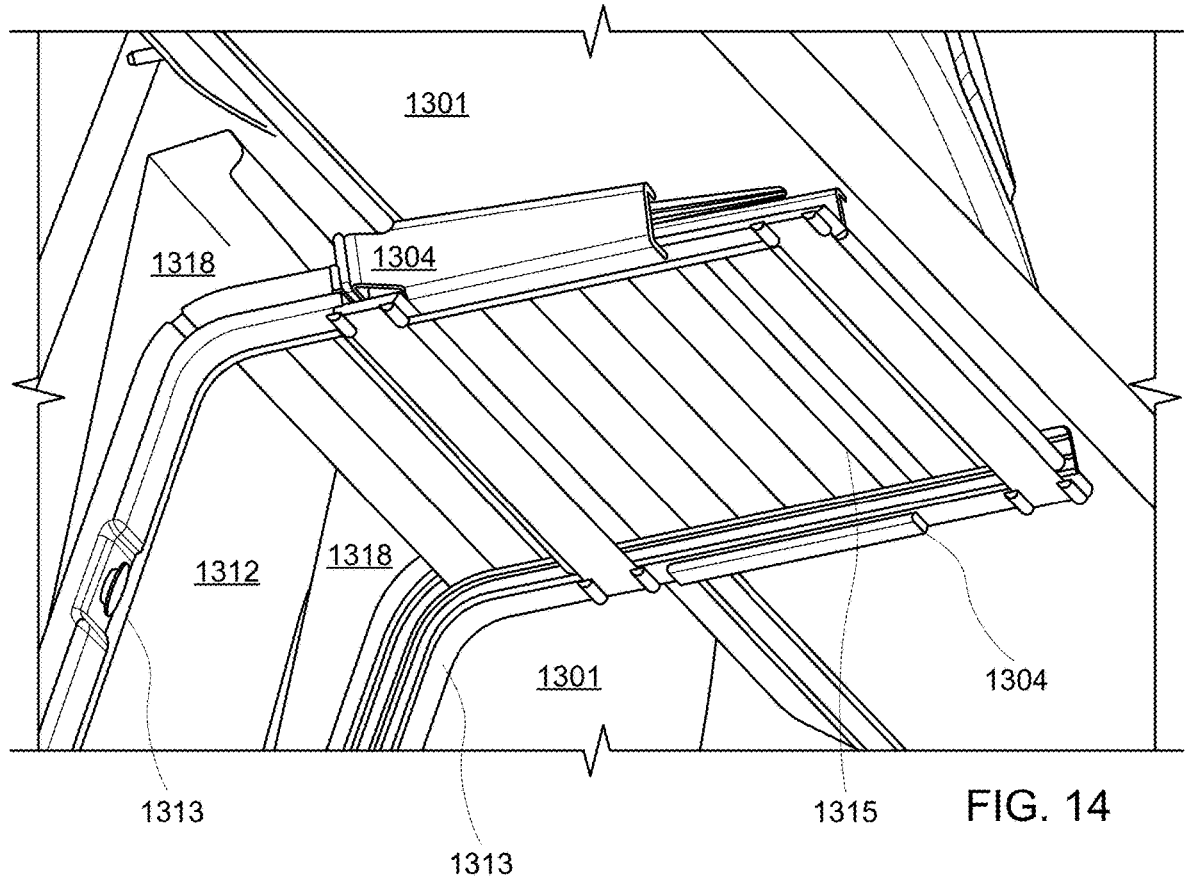
FIG. 14 shows a perspective view, from below and inside the occupant compartment, of the illustrative access door assembly of FIG. 13, in accordance with some embodiments of the present disclosure.

FIG. 13 shows a perspective view, from the rear of and above the occupant compartment, of an illustrative access door assembly with a rear flange (e.g., flange 1388 of threshold element 1318), in accordance with some embodiments of the present disclosure. FIG. 14 shows a perspective view, from below and inside of the occupant compartment, of the illustrative access door assembly of FIG. 13, in accordance with some embodiments of the present disclosure. To illustrate, the illustrative access door assembly of FIGS. 13-14 may be the same as, or similar to, access door assembly 1200 of FIG. 12, illustrated from more rearward angles (e.g., shown from above in FIG. 13 and from below in FIG. 14). As illustrated, an assembly may include frame element 1301, door 1315, threshold elements 1318 and 1313 forming opening 1312, rails 1314, and brackets 1304. Brackets 1304 are configured to mount rails 1314 to frame element 1301. Door 1315 may be opened and closed by sliding door 1315 along rails 1314 (e.g., C-channels as illustrated) to provide access from an occupant compartment to the storage compartment. In some embodiments, threshold element 1318 is configured to provide an interface to the occupant compartment and accordingly may be styled to be compatible with the vehicle interior. To illustrate, a center console (e.g., an independent component, or part of a seat assembly) may seat against threshold element 1318, covering and uncovering opening 1312 when raised or lowered. As illustrated, door 1315 is sectioned (e.g., a tambour style door formed by a plurality of slats), and can be slid vertically to unblock opening 1312 (e.g., by sliding along rails 1314, which are curved). To illustrate, door 1315 may be oriented vertically or near vertically when closed, and horizontal or near horizontal when opened. Flange 1388 is part of threshold element 1318, as illustrated, and may, for example, protect wires or other components from opening 1312 and door motion (e.g., to prevent damage or entanglement). Component 1375, which may include electronic components and wiring, is arranged above door 1315 and opening 1312 to avoid blocking egress to the storage compartment. For example frame element 1301 may be configured for mounting component 1375 out of the way of door 1315.

Figure 15:
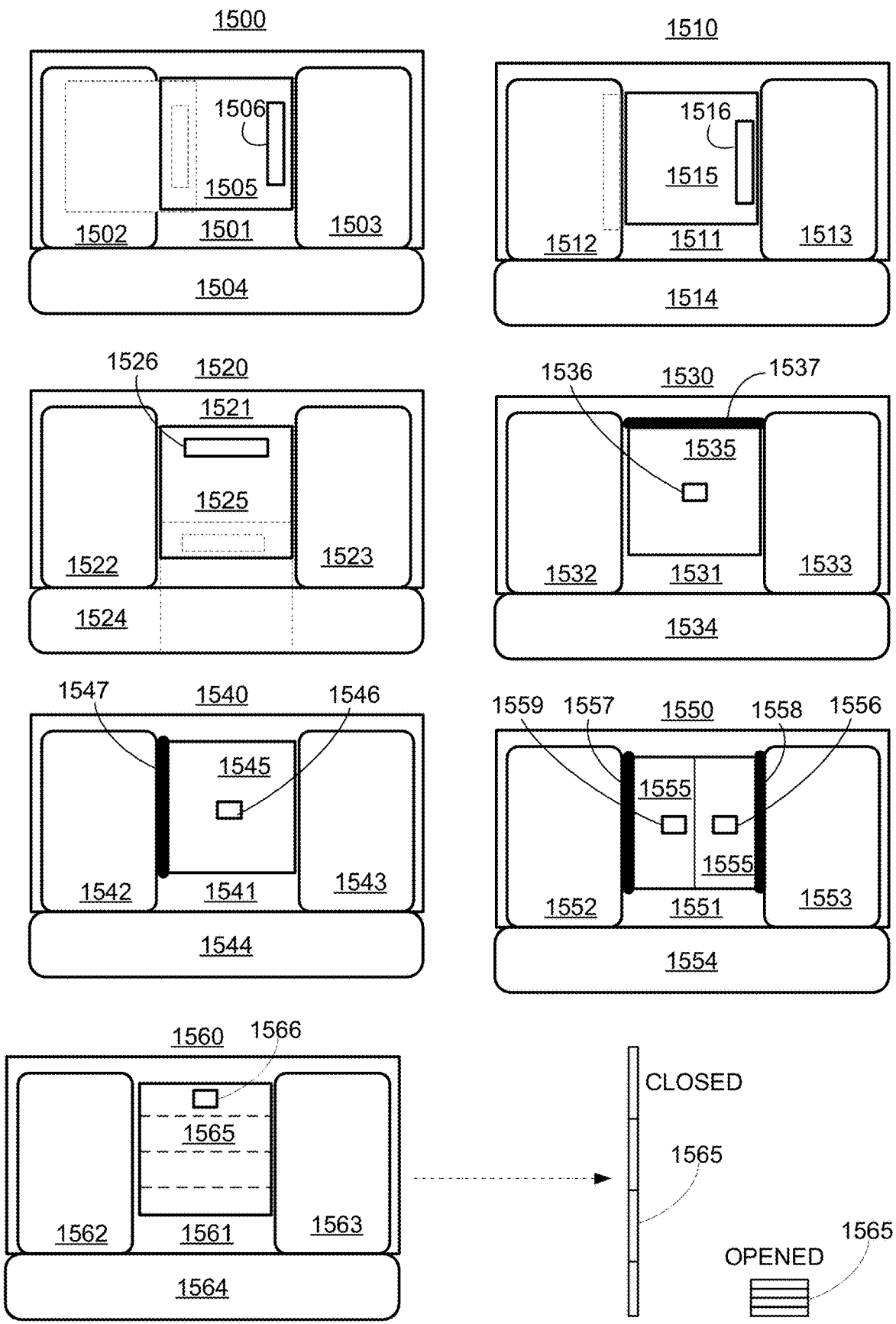
FIG. 15 shows a block diagram of illustrative access doors having various opening configurations, in accordance with some embodiments of the present disclosure.

FIG. 15 shows a block diagram of illustrative access doors having various opening configurations, in accordance with some embodiments of the present disclosure.

Panel 1500 shows access door 1505, which provides access to a storage compartment behind frame element 1501 and seat elements 1502-1504 (e.g., seat backs 1502 and 1503, and seat bottom 1504). Access door 1505, having handle 1506, is configured to translate sideways (e.g., left to right, or right to left), as illustrated by the dashed outline. In some embodiments, for example, access door 1505 is configured to slide along a rail affixed to frame element 1501. In some embodiments, for example, access door 1505 is a pocket door configured to slide into a recess of frame element 1501.

Panel 1510 shows access door 1515, which provides access to a storage compartment behind frame element 1511 and seat elements 1512-1514 (e.g., seat backs 1512 and 1513, and seat bottom 1514). Access door 1515, having handle 1516, is configured to roll out of the way to unblock the opening (e.g., left to right, or right to left), as illustrated by the dashed outline.

Panel 1520 shows access door 1525, which provides access to a storage compartment behind frame element 1521 and seat elements 1522-1524 (e.g., seat backs 1522 and 1523, and seat bottom 1524). Access door 1525, having handle 1526, is configured to translate down out of the way to unblock the opening, as illustrated by the dashed outline. In some embodiments, for example, access door 1525 is configured to slide along a rail affixed to frame element 1521. In some embodiments, for example, access door 1525 is a pocket door configured to slide into a recess of frame element 1521.

Panel 1530 shows access door 1535, which provides access to a storage compartment behind frame element 1531 and seat elements 1532-1534 (e.g., seat backs 1532 and 1533, and seat bottom 1534). Access door 1535, having handle 1536, is configured to rotate out of the way to unblock the opening (e.g., rotate about hinge 1537 arranged at the top of the opening). Access door 1535 may rotate outwards into the occupant compartment, or inwards into the storage compartment. In accordance with the present disclosure, a hinge may be included at any suitable edge of a door (e.g., top, bottom, left, right).

Panel 1540 shows access door 1545, which provides access to a storage compartment behind frame element 1541 and seat elements 1542-1544 (e.g., seat backs 1542 and 1543, and seat bottom 1544). Access door 1545, having handle 1546, is configured to rotate out of the way to unblock the opening (e.g., rotate about hinge 1547 arranged at the side of the opening). Access door 1545 may rotate outwards into the occupant compartment, or inwards into the storage compartment.

Panel 1550 shows two-part access door 1555, which provides access to a storage compartment behind frame element 1551 and seat elements 1552-1554 (e.g., seat backs 1552 and 1553, and seat bottom 1554). Each part of access door 1555, having handles 1556 and 1559, is configured to rotate out of the way to unblock the opening (e.g., rotate about respective hinges 1557 and 1558 arranged on either side of the opening). For example, and occupant may pull handles 1557 and 1558 to open access door 1555 such that each part rotates out of the way about the respective hinge. Access door 1555 may rotate outwards into the occupant compartment, or inwards into the storage compartment.

Panel 1560 shows access door 1565, which provides access to a storage compartment behind frame element 1561 and seat elements 1562-1564 (e.g., seat backs 1562 and 1563, and seat bottom 1564). Access door 1565, having handle 1566, is sectioned and configured to fold out of the way to unblock the opening (e.g., to the right, left, top, or bottom sides), as illustrated by the dashed outline. For example, access door 1565 may include pleats, hinges, or flex joints that allow folding. To illustrate, a side view of access door 1565 in both the opened and closed configuration is shown. In some embodiments, access door 1565 is flexible and may be collapsed or otherwise deformed out of the way of the opening in frame element 1561 to allow access to the storage compartment.

Figure 16:
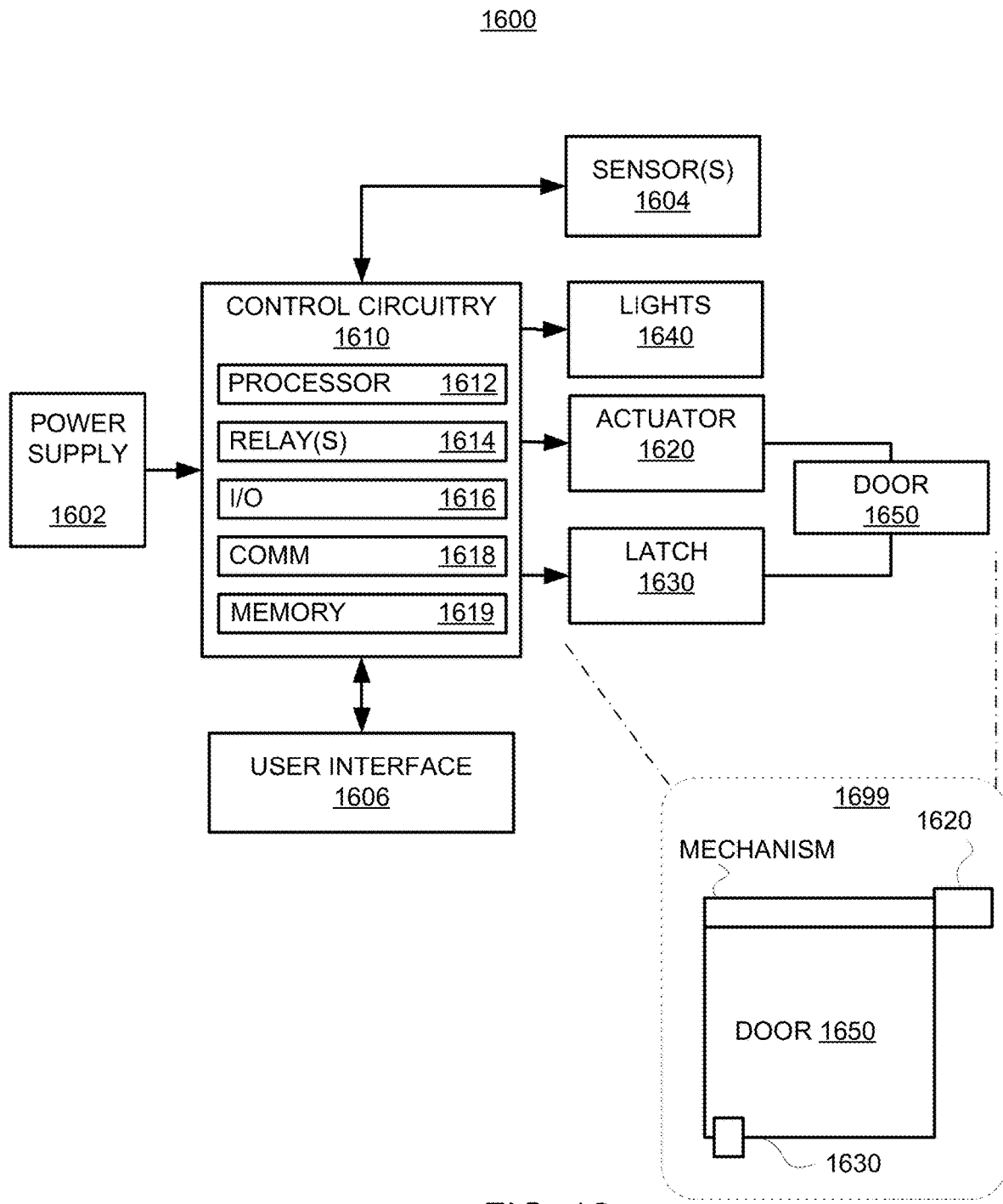
FIG. 16 shows a block diagram of an illustrative system for controlling an access door, in accordance with some embodiments of the present disclosure.

FIG. 16 shows a block diagram of illustrative system 1600 for controlling an access door, in accordance with some embodiments of the present disclosure. As illustrated, system 1600 includes control circuitry 1610, actuator(s) 1620, latch 1630 (e.g., which may include a latch actuator), lights 1640, sensors 1604, user interface 1606, and power supply 1602, in accordance with some embodiments of the present disclosure. Illustrative control circuitry 1610 includes processor 1612, one or more relays 1614 (hereinafter referred to as relay(s) 1614), input/output 1616 (hereinafter referred to as I/O 1616), communication hardware 1618 (hereinafter referred to as COMM 1618), and memory 1619.

Control circuitry 1610 may include hardware, software, or both, implemented on one or more modules configured to provide control of an access door (e.g., door 1650). In some embodiments, processor 1612 includes one or more microprocessors, microcontrollers, digital signal processors, programmable logic devices, field-programmable gate arrays (FPGAs), application-specific integrated circuits (ASICs), or any suitable combination thereof. In some embodiments, processor 1612 is distributed across more than one processor or processing units. In some embodiments, control circuitry 1610 executes instructions stored in memory for managing a motion of door 1650. In some embodiments, memory 1619 is an electronic storage device that is part of control circuitry 1610. For example, memory may be configured to store electronic data, computer instructions, applications, firmware, or any other suitable information. In some embodiments, memory 1619 includes random-access memory, read-only memory, hard drives, optical drives, solid state devices, or any other suitable memory storage devices, or any combination thereof. For example, memory may be used to launch a start-up routine.

In some embodiments, control circuitry 1610 is powered by power supply 1602. In some embodiments, power supply 1602 includes a car battery (e.g., a 12 V lead acid battery), a DC-DC converter, an AC power supply (e.g., generated by suitably inverting a DC power supply), any other power supply, any corresponding components (e.g., terminals, switches, fuses, and cables), or any combination thereof. In some embodiments, power supply 1602 supplies power to actuator 1620, latch 1630, sensors 1604, user interface 1606, control circuitry 1610, any other suitable systems or components, or any combination thereof.

In some embodiments, user interface 1606 includes a push button, a toggle switch, a display screen (e.g., a touch screen), a key fob, a key-lock combination, any other suitable system or component for receiving input from a user or providing output to a user, or any combination thereof. In some embodiments, user interface 1606 includes a touchscreen on the dash of a vehicle, configured to receive input from the user, and provide a display to the user. In some embodiments, user interface 1606 includes one or more buttons that are selectable by a user. For example, the one or more buttons may include a button coupled to a switch, a button on a touchpad, any other suitable button that may be used by a user to make a selection, or any combination thereof. In some embodiments, a key fob includes one or more buttons, which, when pressed by a user, may provide an indication to COMM 1618 of control circuitry 1610. In some embodiments, user interface 1606 is implemented on a smartphone, tablet, or other portable device, which may communicate with control circuitry 1610 via COMM 1618. For example, a software application, or "app," may be implemented on a smartphone, with user-selectable options for controlling door 1650 which may be communicated to COMM 3118 via a 3G network, WiFi, Bluetooth, or other suitable communication.

In some embodiments, sensor(s) 1604 include one or more proximity switches, limit switches, position sensors, current sensors, voltage sensors, torque sensors, haptic sensors, any other suitable sensors, or any combination thereof. For example, sensor(s) 1604 may include an position sensor, one or more limit switches, or other suitable device for determining or controlling position of door 1650. In a further example, sensor(s) 1604 may include a current sensor configured to measure current provided to one or more actuators (e.g., actuator 1620, or latch 1630).

In some embodiments, actuator 1620 includes, or is accompanied by, a rotary actuator (e.g., an AC motor, or a DC motor), a linear actuator (e.g., an electric solenoid, rotary-threaded screw actuator, hydraulic actuator, or a pneumatic actuator), a counterweight, a rotation element (e.g., a torsion spring or damper), any other suitable hardware, or any combination thereof. For example, actuator 1620 may include a stepper motor, a servo motor, an induction motor, or other type of motor. In a further example, actuator 1620 may include a DC motor and a gear drive. In an illustrative example, referencing FIG. 12, actuator 1620 may include an electric motor geared to rails 1214 and configured to apply force to door 1215 (e.g., via a rack and pinion interface). In an illustrative example, referencing FIG. 12, actuator 1620 may include an electric motor coupled via a cable or linkage to door 1215 and configured to apply force to door 1215 (e.g., by rotating a spool to tension the cable). In a further illustrative example, referencing FIG. 12, actuator 1620 may include an electric motor geared to rails 1214 and configured to apply force to door 1215 (e.g., via a rack and pinion interface). In a further illustrative example, referencing FIG. 9 or 11, actuator 1620 may include an electric motor configured to rotate hinge 1116 or hinge 914 (e.g., either directly or geared). In a further illustrative example, referencing FIG. 15, actuator 1620 may include an electric motor and a linkage such as a scissor linkage, rack-pinion, or any other suitable mechanism, interfaced to a movable door to apply force on the door (e.g., using a scissor mechanism) coupled to door 1505, 1515, 1525. In a further illustrative example, referencing FIG. 15, actuator 1620 may include an electric motor coupled to, and configured to actuate, hinge 1537, 1547, 1557, or 1556. In some embodiments, actuator 1620 is a linear actuator coupled to door 1650 via a linkage to convert the linear motion to either a rotary door motion, a linear door motion, or any other suitable door trajectory.

In some embodiments, latch 1630 includes, or is accompanied by, a rotary actuator (e.g., an AC motor, or a DC motor), a linear actuator (e.g., an electric solenoid, hydraulic actuator, or a pneumatic actuator), a lock, a latch, a cable, any other suitable hardware, or any combination thereof. In some embodiments, a plurality of latches may be included to, for example, secure both sides of door 1650 to the mating interface (e.g., a chute or frame element). In an illustrative example, referencing FIG. 15, any of the doors or arrangements of FIGS. 2-15 may include a latch mechanism such as a magnetic latch (e.g., permanent magnets or controlled electromagnets), a cinching latch (e.g., using an electromechanical latch and a pin or loop), a retractable pin, a rotatable lock element, any other suitable controllable latching mechanism, any other suitable spring-actuated latching mechanism, any other suitable manually operated latching mechanism, or any combination thereof. Latch 1630 may be configured to hold door 1650 in a closed configuration, an open configuration, or either an open or closed configuration. In some embodiments, latch 1630 includes more than one latching mechanism. For example, a system may include a latch for maintaining the open configuration and a latch for maintaining the closed configuration, or multiple latches to maintain either the open or closed configuration. In some embodiments, latch 1630 is configured to provide one or more detents for positions of the door.

Illustrative system 1600 of FIG. 16 may be used to control any of the access door assemblies disclosed herein, in accordance with the present disclosure. In some embodiments, not all components shown in FIG. 16 need be included in system 1600. For example, in some embodiments, no actuator 1620 is included, and door 1650 is moved based on manual input (e.g., forces generated by a user). In a further example, in some embodiments, no latch 1630 is included, and latches are secured and released manually by a user (e.g., corresponding magnets that provide a position detent requiring some force to unseat). In a further example, in some embodiments, user interface 1606 includes only electrical switches, and control circuitry 1610 includes only relays 1614, which provide power from power supply 1602 to actuator 1620, latch 1630, or both, based on positions of the electrical switches. In a further example, system 1600 need not include sensor(s) 1604. In some embodiments, an access door operates completely under manual control, and system 1600 is not needed to control the door position.

In some embodiments, as illustrated, system 1600 includes lights 1640 coupled to control circuitry 1610. For example, lights 1640 may be same as, or similar to, lights 1176 of FIG. 11 or lights 1276 of FIG. 12, and may be arranged in a storage compartment or as part of a threshold to the storage compartment. In some embodiments, lights 1640 are coupled to control circuitry 1610 by a cable, wiring harness, one or more electrical connectors (e.g., having electrical terminals), a socket or other mechanical interface, any other suitable components or features, or any suitable combination thereof. In some embodiments, I/O 1616 may include relays, switches, voltage dividers, or other circuitry for providing and controlling a DC voltage to lights 1640 based on a sensor input, a switch throw position, a button actuation (e.g., a hard button or soft button of user interface 1606), or a combination thereof. In an illustrative example, control circuitry 1610 may cause lights 1640 to provide light when door 1650 is opened, and turn off when door 1650 is closed, based on a suitable sensor signal from sensor(s) 1604, which may include a proximity sensor, a touch sensor, an electrical contact, or any other suitable sensor. To illustrate, control circuitry 1610 may receive sensor signals from sensor(s) 1604, determine whether door 1650 is opened or closed based on the sensor signal, and then generate a control signal for lights 1640 (e.g., outputted by I/O 1616 and transmitted via wires to lights 1640). In a further illustrative example, control circuitry 1610 may include an electrical circuit for providing electrical power to lights 1640, and door 1650 may trigger an electrical switch (e.g., coupled to control terminals of a relay) such that when door 1650 is opened, electrical power is provided to lights 1640 (e.g., outputted by I/O 1616 and transmitted via wires to lights 1640). In a further illustrative example, lights 1640 may be configured to turn on when motion is sensed in the storage compartment or threshold, and turn off after a predetermined time without motion, based on a suitable sensor signal from sensor(s) 1604, which may include a motion sensor, an optical sensor, a proximity sensor, or any other suitable sensor. In a further illustrative example, control circuitry 1610 may be configured to turn lights 1604 on and off based on input from user interface 1606 (e.g., input received at user interface 1606), which may include a hard-wired button, a soft button (e.g., on a touchscreen on a console or mobile device), a switch (e.g., an on-off switch, or dimmer switch arranged near the threshold or a console), any other suitable interface for receiving input from a user, or any combination thereof. In some embodiments, at least one light of lights 1640 is arranged in the storage compartment, and control circuitry 1610 is coupled to the at least one light and is configured to provide electrical power to the at least one light to illuminate the storage compartment when door 1650 is in in opened state.

In an illustrative example, a vehicle may include system 1600, having an actuator (e.g., actuator 1620) that is coupled to a movable door (e.g., door 1650) and configured to move the movable door. Further, control circuitry 1616 may be coupled to the actuator (e.g., actuator 1620) and may be configured to cause the movable door (e.g., door 1650) to achieve a first state (e.g., a closed state) and the second state (e.g., an opened state) by controlling the actuator. In some embodiments, the vehicle includes a latching mechanism (e.g., latch 1630) to hold the movable door (e.g., door 1640) in the first state (e.g., a closed state) and the second state (e.g., an opened state). In some embodiments, the vehicle includes the actuator that is coupled to the movable door and configured to move the movable door, and the actuator (e.g., actuator 1620) is configured receive a control signal from control circuitry 1616 to cause the movable door to achieve the first state (e.g., a closed state) and the second state (e.g., an opened state)

Figure 17:
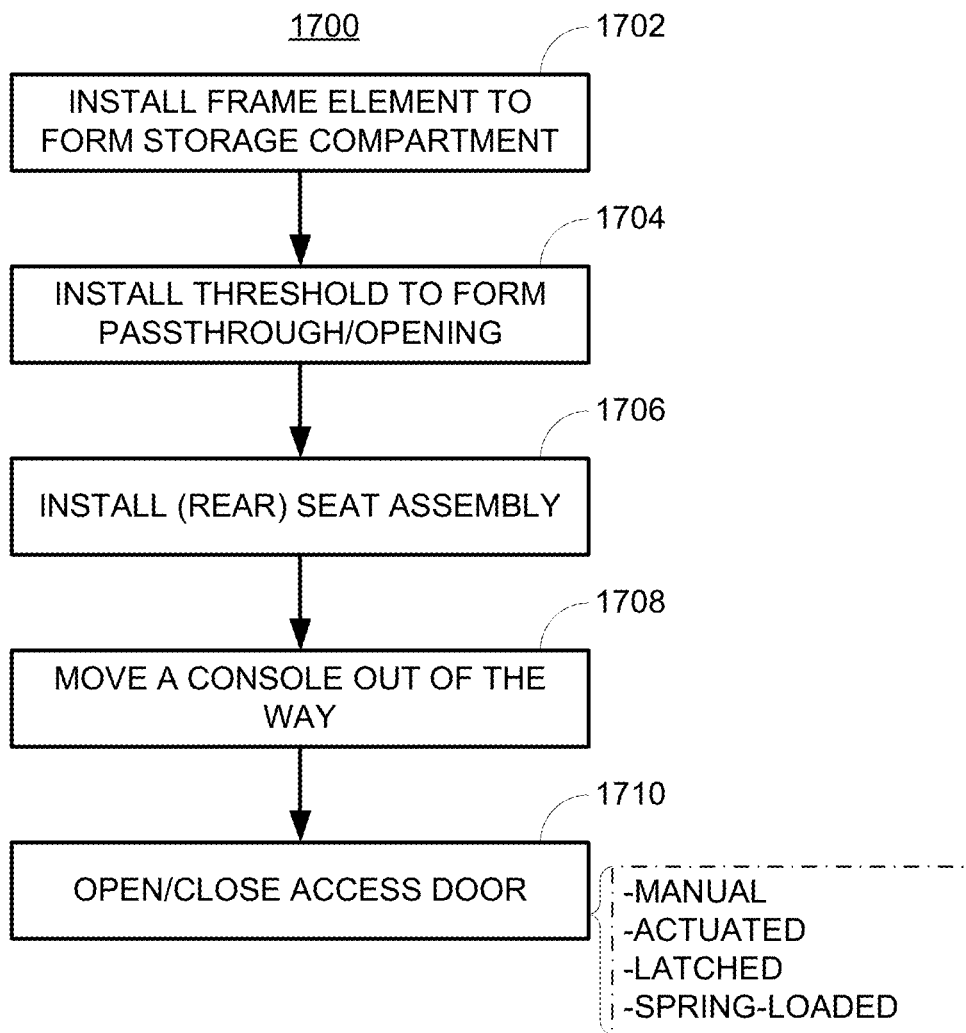
FIG. 17 is a flowchart of an illustrative process for installing and using an access door, in accordance with some embodiments of the present disclosure.

FIG. 17 is a flowchart of illustrative process 1700 for installing and using an access door, in accordance with some embodiments of the present disclosure. To illustrate, the access door is installed in a vehicle having an occupant compartment and a storage compartment.

At step 1702, one or more frame elements are installed to form at least part of a storage compartment. In some embodiments, step 1702 includes welding, riveting, adhering, or otherwise affixing frame elements to form a vehicle frame, body, or other structure to which components may be mounted. In some embodiments, each of the one or more frame elements may be formed from sheet metal (e.g., stamped, bent, or otherwise formed sheet steel or aluminum), plastic (e.g., injection molded plastic), or a combination thereof. In some embodiments, the storage compartment may be further defined by surface elements (e.g., plastic and trim to provide a smooth surface), and other frame elements that do not include passthroughs.

At step 1704, one or more threshold elements are installed to form a passthrough in the one or more frame elements of step 1702. In some embodiments, each of the one or more threshold elements may be formed from sheet metal (e.g., stamped, bent, or otherwise formed sheet steel), plastic (e.g., injection molded plastic), or a combination thereof. In some embodiments, the one or more threshold elements are fastened (e.g., bolted or screwed), riveted, adhered, welded, clamped, clipped, or otherwise affixed to one or more frame elements. In some embodiments, steps 1702 and 1704 may be combined, omitted, or otherwise modified. For example, the one or more threshold elements may be included in the one or more frame elements (e.g., the threshold forming the opening is formed in a frame element).

At step 1706, a rear seat assembly is installed in the occupant compartment. In some embodiments, a vehicle may include only one row of seats, in which case step 1706 includes installing the seat assembly. The rear seat assembly includes one seat, two seats, three seats (e.g., a three-seat bench seat), a bench seat, or any other suitable number of seat of any suitable types. In some embodiments, the rear seat assembly includes a console that may be centered (e.g., between seats) or offset (e.g., next to a seat, not necessarily centered).

At step 1708, a console is moved out of the way to provide access to the access door. In some embodiments, the console is lowered or otherwise moved to expose an access door. For example, a rear seat may include three seats, with a center console forming a backrest to the middle seat, wherein the center console may be lowered to expose the access door. In some embodiments, step 1708 need not be performed. For example, a seat assembly may include an opening without a console such that the access door is not blocked by a console.

At step 1710, an access door is opened or closed to provide or prevent access to the storage compartment from the occupant compartment. The access door may be slid (e.g., side-to-side or up-down), rotated (e.g., about one or more hinges), folded or otherwise collapsed (e.g., along a rail system), or actuated in any other suitable way. In some embodiments, the access door assembly may include a movable part and a stationary part. In some embodiments, step 1710 includes manually opening the access door, actuating the access door (e.g., using actuator 1620 as controlled by control circuitry 1610 of FIG. 16), de-latching the access door (e.g., using latch 1630 as controlled by control circuitry 1610 of FIG. 16), or a combination thereof. In some embodiments, step 1710 may include closing the access door, de-actuating the access door, latching the access door, or a combination thereof. In some embodiments, a latch or access door may be spring-loaded, gravity biased, or otherwise biased or preloaded to only require force to be applied in one direction (e.g., movement in the other direction is actuated by the biasing force).

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A vehicle, comprising:
a frame element, comprising a first opening, forming at least a part of a storage compartment arranged adjacent to an occupant compartment having a seat assembly with a center console;
a threshold element, affixed to the frame element, comprising a second opening between the storage compartment and the occupant compartment, wherein the second opening is aligned with the first opening;
a sliding door; and
a rail assembly, wherein:
the sliding door is configured to slide along the rail assembly into a recess to achieve:
a first state wherein the second opening is blocked by the sliding door, and wherein the sliding door, the threshold element, and the frame element form a boundary of the storage compartment; and
a second state wherein the second opening is unblocked by the sliding door.

2. The vehicle of claim 1, wherein the rail assembly is affixed to the threshold element.

3. The vehicle of claim 1, further comprising a latching mechanism to hold the sliding door in the first state and the second state.

4. The vehicle of claim 1, wherein the storage compartment is accessible via a first side opening from a first side of the vehicle and a second side opening from a second side of the vehicle.

5. The vehicle of claim 1, wherein the sliding door is comprised of a plurality of horizontal slats.

6. The vehicle of claim 1, further comprising a truck bed arranged behind the storage compartment, wherein the truck bed and the storage compartment are separated from each other.

7. The vehicle of claim 1, wherein the center console is movable between a lowered state and a stowed state, and wherein the first state and the second state are achievable with the center console in the lowered state.

8. The vehicle of claim 1, wherein the sliding door is configured to achieve the first state and the second state independent of whether a seat back of the seat assembly is lowered or upright.

9. The vehicle of claim 1, further comprising:
an actuator coupled to the sliding door and configured to move the sliding door; and
control circuitry coupled to the actuator and configured to cause the sliding door to achieve the first state and the second state by controlling the actuator.

10. The vehicle of claim 1, further comprising:
at least one light arranged in the storage compartment; and
control circuitry coupled to the at least one light and configured to provide electrical power to the at least one light to illuminate the storage compartment when the sliding door is in the second state.

11. The vehicle of claim 10, further comprising:
an input interface configured to receive input, wherein the control circuitry is further configured to provide electrical power to the at least one light based on the input.

12. An access door assembly for a vehicle storage compartment, the access door assembly comprising:
a frame element, comprising a first opening, forming at least a part of a storage compartment arranged adjacent to an occupant compartment, and wherein the frame element is configured to be coupled to a seat assembly arranged in the occupant compartment;
a threshold element affixed to the frame element comprising a second opening to the storage compartment and to the occupant compartment, wherein the second opening is aligned with the first opening;
a sliding door; and
a rail assembly, wherein:
the sliding door is configured to slide along the rail assembly into a recess to achieve:
a first state wherein the second opening is blocked by the sliding door; and
a second state wherein the second opening is unblocked when the sliding door is in the recess.

13. The access door assembly of claim 12, wherein the rail assembly is affixed to the threshold element.

14. The access door assembly of claim 12, further comprising a latching mechanism to hold the sliding door in the first state and the second state.

15. The access door assembly of claim 12, further comprising at least one light arranged in the storage compartment and coupled to control circuitry, wherein the at least one light is configured to illuminate the storage compartment when the sliding door is in the second state.

16. The access door assembly of claim 12, wherein the sliding door is comprised of a plurality of horizontal slats.

17. The access door assembly of claim 12, wherein the first state and the second state are achieved independent of the seat assembly.

18. The access door assembly of claim 12, wherein the occupant compartment and the storage compartment are separate compartments, and wherein the storage compartment is accessible via a side opening from at least one side of a vehicle comprising the access door assembly.

19. The access door assembly of claim 12, further comprising:

an actuator coupled to the sliding door and configured to move the sliding door, wherein the actuator is configured receive a control signal from control circuitry to cause the sliding door to achieve the first state and the second state.

20. A vehicle, comprising:

an occupant compartment having a seat assembly with a center console;

a storage compartment that is separate from the occupant compartment, and accessible from each side of the vehicle via a respective side opening;

a frame element separating the occupant compartment and the storage compartment, wherein the frame element comprises a frame element opening; and a sliding door arranged to block and unblock the frame element opening when the sliding door is slid along a rail assembly out of and into a recess independent of the seat assembly to disallow or allow access between the occupant compartment and the storage compartment.

* * * * *